(12) United States Patent
Kontsevich et al.

(10) Patent No.: US 11,151,234 B2
(45) Date of Patent: Oct. 19, 2021

(54) AUGMENTED REALITY VIRTUAL REALITY TOUCHLESS PALM PRINT IDENTIFICATION

(71) Applicant: Redrock Biometrics, Inc., San Francisco, CA (US)

(72) Inventors: Leonid Kontsevich, San Francisco, CA (US); Hua Yang, Millbrae, CA (US)

(73) Assignee: Redrock Biometrics, Inc, San Francisco, CA (US)

( * ) Notice: Subject to any disclaimer, the term of this patent is extended or adjusted under 35 U.S.C. 154(b) by 0 days.

(21) Appl. No.: 15/726,322

(22) Filed: Oct. 5, 2017

(65) Prior Publication Data

US 2018/0060683 A1    Mar. 1, 2018

Related U.S. Application Data

(60) Provisional application No. 62/382,067, filed on Aug. 31, 2016.

(51) Int. Cl.
*G06K 9/32* (2006.01)
*G06K 9/00* (2006.01)
(Continued)

(52) U.S. Cl.
CPC ......... *G06F 21/32* (2013.01); *G06K 9/00033* (2013.01); *G06K 9/00067* (2013.01); *G06K 9/00087* (2013.01); *G06K 9/00671* (2013.01); *G06K 9/32* (2013.01); *H04L 63/0861* (2013.01); *H04N 5/23222* (2013.01); *H04N 5/23229* (2013.01); *H04N 5/232945* (2018.08); *H04N 5/44504* (2013.01); *H04W 12/06* (2013.01); *G06T 19/006* (2013.01);
(Continued)

(58) Field of Classification Search
None
See application file for complete search history.

(56) References Cited

U.S. PATENT DOCUMENTS 8,027,518 B2    9/2011  Baker et al.
8,229,178 B2    7/2012  Zhang et al.
(Continued)

FOREIGN PATENT DOCUMENTS

EP    0081276 A2    6/1983

OTHER PUBLICATIONS

Canny edge detector, https://en.wikipedia.orglwiki/CannLedge_detector, downloaded Jun. 1, 2017, 6 pages.
(Continued)

*Primary Examiner* — Edemio Navas, Jr.
(74) *Attorney, Agent, or Firm* — Brad Bertoglio; Intelink Law Group, P.C.

(57) ABSTRACT

A computing platform is described to match a palm digital representation to a palm template. The platform includes logic causing presenting a viewfinder image including an image stream and/or a cue appearing to reside substantially in front of a user to guide the user to align a palm at a position within a field of view of a camera; capturing a set of images using the camera; processing the set of images to determine a set of identifying features of the palm; and comparing the set of identified features with enrolled palm prints to identify the palm.

27 Claims, 18 Drawing Sheets

(51) Int. Cl.

| | | |
|---|---|---|
| *H04N 5/232* | (2006.01) | |
| *H04N 5/445* | (2011.01) | |
| *G06F 21/32* | (2013.01) | |
| *H04L 29/06* | (2006.01) | |
| *H04W 12/06* | (2021.01) | |
| *H04N 21/422* | (2011.01) | |
| *H04N 13/332* | (2018.01) | |
| *H04N 13/361* | (2018.01) | |
| *G06T 19/00* | (2011.01) | |

(52) U.S. Cl.
CPC ......... *H04N 13/332* (2018.05); *H04N 13/361* (2018.05); *H04N 21/42206* (2013.01)

(56) References Cited

U.S. PATENT DOCUMENTS

| | | |
|---|---|---|
| 8,538,088 B2 | 9/2013 | Hama et al. |
| 9,153,074 B2 | 10/2015 | Zhou et al. |
| 9,390,630 B2* | 7/2016 | Daniels ................. G09B 15/00 |
| 9,594,891 B2 | 3/2017 | Iwata |
| 9,659,205 B2 | 5/2017 | Demos |
| 2004/0264742 A1 | 12/2004 | Zhang et al. |
| 2011/0213664 A1 | 9/2011 | Osterhout et al. |
| 2012/0253607 A1 | 10/2012 | Choi |
| 2012/0313839 A1* | 12/2012 | Smithwick ............ G09G 3/003 345/6 |
| 2013/0127980 A1 | 5/2013 | Haddick et al. |
| 2013/0312090 A1 | 11/2013 | Sahin et al. |
| 2014/0063055 A1 | 3/2014 | Osterhout et al. |
| 2014/0068740 A1 | 3/2014 | LeCun et al. |
| 2014/0282271 A1 | 9/2014 | Lu et al. |
| 2015/0020181 A1* | 1/2015 | Iwata ..................... G06F 21/32 726/7 |
| 2015/0186708 A1 | 7/2015 | Katz |
| 2015/0264339 A1* | 9/2015 | Riedel ................ G02B 27/2235 348/54 |
| 2016/0091975 A1* | 3/2016 | Kumar ................... G06F 3/017 345/8 |
| 2016/0092726 A1* | 3/2016 | Li ...................... G06K 9/00355 345/156 |
| 2016/0116740 A1* | 4/2016 | Takahashi ............... G06F 21/32 345/8 |
| 2016/0140766 A1* | 5/2016 | Balachandreswaran .................... G06T 19/006 345/633 |
| 2016/0224123 A1* | 8/2016 | Antoniac ................ G06F 3/017 |
| 2016/0290764 A1* | 10/2016 | Chen ........................ H04N 5/33 |
| 2017/0118202 A1* | 4/2017 | Mathew .............. H04L 63/0846 |
| 2017/0140547 A1* | 5/2017 | Tsurumi ................. G01B 11/26 |

OTHER PUBLICATIONS

Corner Detection, https://enwikipedia.org/wiki/Corner_detection, downloaded May 30, 2017, 8 pages.
Features from accelerated segment test, https://enwikipedia.org/wiki/Features_from_accelerated_segment_test, downloaded May 30, 2017, 6 pages.
Random Sample Consensus (RANSAC), https://en.wikipedia.orglwiki/Random_sample_consensus, downloaded May 30, 2017, 10 pages.
Scale-invariant feature transform, https://en.wikipedia.orglwiki/Scale-invariant_feature_transform, downloaded May 30, 2017, 18 pages.
Frangi et al. "Multiscale vessel enhancement filtering," MICCAI '98, v. 1496, Springer Verglag, Berlin, Germany, Oct. 11, 1998, pp. 130-137.
Harris et al., "A combined corner and edge detector," In Proc. of Fourth Alvey Vision Conference Aug. 31-Sep. 2, 1988 6 pages.
File:CIExy1931.png, found at https://commons.wikimedia.org/wiki/File:CIExy1931.png, downloaded Jun. 5, 2017, 4 pages.
Khatkar et al., "Biomedical Image Enhancement Using Wavelets," International Conference on Computer, Communication and Convergence, Dec. 17-28, 2014, Procedia Computer Science 48 (2015) 513-517.
Krujatz et al., "Exploiting the Potential of OLED-Based Photo-Organic Sensors for Biotechnological Applications," Chem Sci J 2016, 7:3, Sep. 2016, 10 pages.
Lowe, "Object recognition from local scale-invariant features," Proceedings of the Seventh IEEE International Conference on Computer Vision, v2. Kerkyra, Sep. 20-27, 1999, pp. 1150-1157.
Rosten et al., "Faster and Better: A Machine Learning Approach to Corner Detection," in IEEE Transactions on Pattern Analysis and Machine Intelligence, vol. 32, No. 1, pp. 105-119, Jan. 2010.
Ku, X, et al, "Multispectral Palm print Recognition Using a Quaternion Matrix," Sensors 2012, 12, Apr. 10, 2012, 633-4647.
"Fujitsu Laboratories Develops Technology for World's First Contactless Palm Vein Pattern Biometric Authentication System", Mar. 31, 2003, 2 pages.
Aoyama, Shoichiro, et al., "A Contactless Palmprint Recognition Algorithm for Mobile Phones", 2013. 5 pages.
Jain, Anil K., et al., "A Prototype Hand Geometry-based Verification System", Mar. 22-24, 1999, 6 pages.
Zhen Yu et al., "An exploration of usable authentication mechanisms for virtual reality systems" (Abstract), 2016 IEEE Asia Pacific Conference on Circuits and Systems (Oct. 25-28, 2016).

\* cited by examiner

AUGMENTED REALITY VIRTUAL REALITY TOUCHLESS PALM PRINT IDENTIFICATION

CROSS-REFERENCE TO RELATED APPLICATIONS

This application claims the benefit of U.S. Provisional Application No. 62/382,067, entitled "A GUIDE FOR POSITIONING PALM IN VR/AR ENVIRONMENT", filed 31 Aug. 2016. This provisional application is hereby incorporated by reference for all purposes.

This application incorporates by reference commonly owned, commonly invented U.S. patent application Ser. No. 15/615,683, entitled "BLUE/VIOLET LIGHT TOUCHLESS PALM PRINT IDENTIFICATION", filed 6 Jun. 2017.

BACKGROUND

Field

The technology disclosed generally relates to detecting biometric features of a control object including human hands, and more particularly relates to application of palm print digitalization to security and authentication for use with augmented reality, virtual reality and/or wearable computing technologies.

Description of Related Art

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Palm print authentication has been subject of development for some types of authentication systems. A variety of different approaches have been tried. For example, some approaches have used palm geometry to try to identify someone by their palm. Others use palm vein patterns. Still others use combinations of parameters. Yet these implementations failed to live up to the standards required for widespread adoption. Still others required fixtures to hold the hand rigid in space.

Head mounted devices (HMDs) and wearable goggles have received attention in the media as possible platforms for deploying applications that implement virtual reality (e.g., substitution of a virtualized environment for a real environment) or augmented reality (e.g., inclusion of one or more virtual objects into a presentation of a real environment). Authenticating a user of such devices can be important when the device is used as an interface to a computing application to prevent an unauthorized user from viewing confidential data from the application or from accessing a virtual or augmented environment having a limited authorized audience. Adding a hardware device, such as a fingerprint reader to the head mounted display presents significant issues of weight, size, power consumption, additional interfaces and usability that make such additions undesirable.

All-in-one AR/VR headsets generally lack a physical keyboard to type passwords. Additionally, such all-in-one AR/VR headsets prove to be difficult platforms for implementing many traditional forms of biometric identity verification because the user's face and iris cannot be easily sensed due to the headset's presence: the face is covered, and the iris requires a backward facing camera which increases cost and complexity, making such additional camera rarely available on existing AR/VR headsets.

It is desirable to provide a palm print authentication technology which can overcome some or all of the issues discussed above.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

A system and various implementations are described for performing computationally efficient identification and authentication of individuals using non-contact or contact-free biometric recognition of the user's palm using one or more cameras. In embodiments, the techniques described are suited to use with head mounted devices (HMD), including headsets, goggles, and the like that provide display of augmented reality (AR) and/or virtual reality (VR) environments to the user wearing the HMD. Headsets enable the wearer to remain cognizant of the surrounding environment using different see-through approaches, including (i) optical see-through headsets; and (ii) video see-through headsets. Optical see-through systems combine computer-generated imagery with "through the glasses" image of the real world, usually through a slanted semi-transparent mirror. The optical see-through type is mostly used in AR. Video-see through systems present only video feeds from cameras located to capture a video stream of the environment surrounding the wearer.

Figure 1:
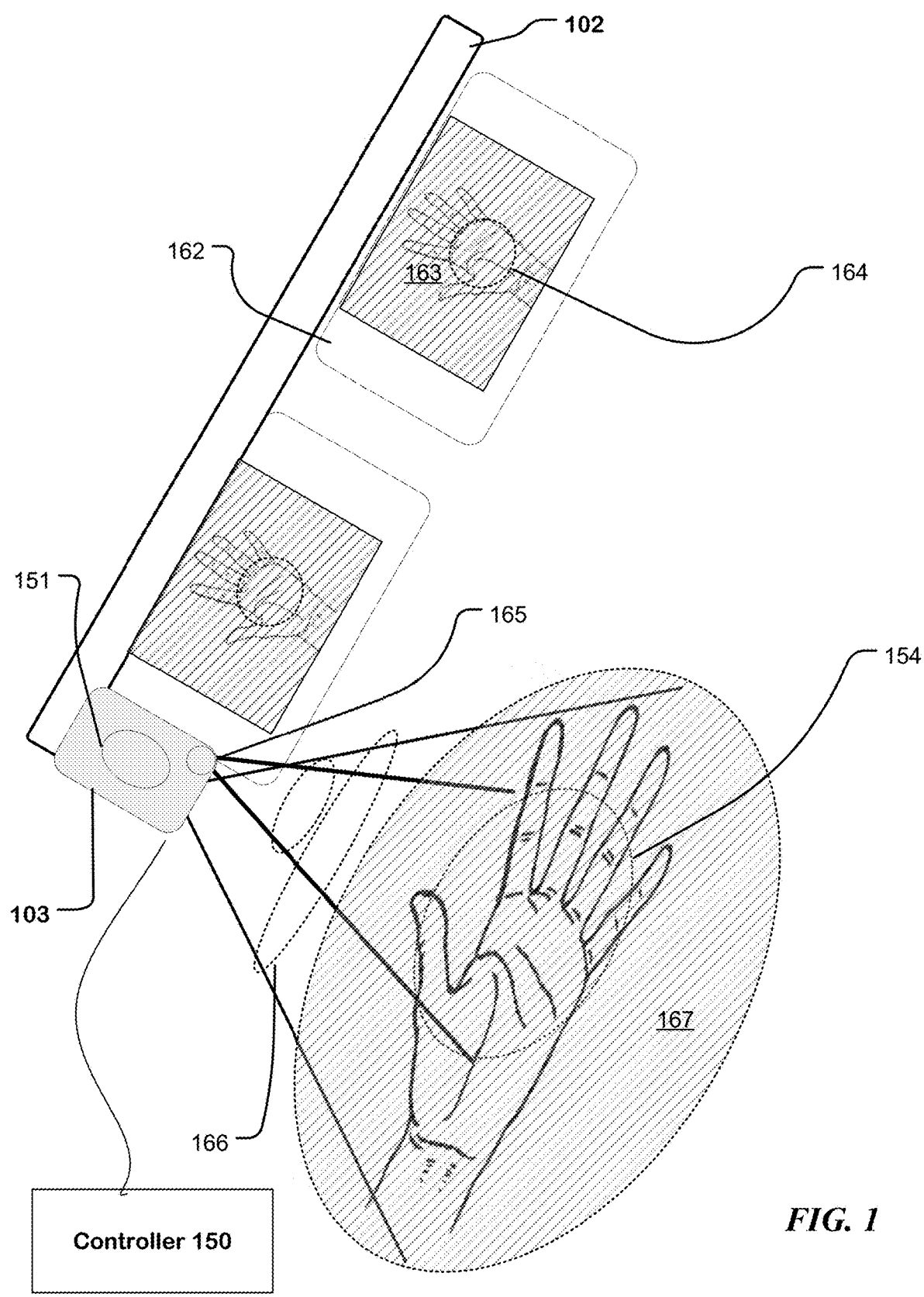
FIG. 1 illustrates a computing device having a head mounted display (HMD) and a user interface that comprise a viewfinder image of a camera and a cue as described herein.

FIG. 1 illustrates a optical see-through headset, which in this example is a headset 102 capable of implementing virtual reality and augmented reality functionality. The headset 102 includes at least one forward facing camera 103 having a lens 151 and display screens 162 situated on transparent or semitransparent portions of goggles and disposed in view of a wearer of headset 102. The field of view 166 of the camera 103 is a region forward of the camera 103 which is mounted on one side of the headset 102 in this example. A viewfinder image 163 produced by the camera is displayed on the display screen 162 in this example. A cue 164 is overlaid upon the viewfinder image 163 in order to guide the user to place the user's palm at a position (and orientation) within the field of view of the camera that facilitates the capturing and matching of palm features. In some embodiments, the cue 164 is limited to a region, such as the circular region 154 shown in the drawing. The cue 164 can include an open area in which to position the user's palm or can be semi-transparent.

The headset 102 is a computing device or is connected by means of a cable or wireless interface to a computing device, e.g., controller 150 that includes logic to execute a sequence of operations to perform palm print authentication. The sequence of operations includes presenting across the display screen 162 viewfinder image 163 that includes an image stream captured by the camera 103 of a region of space in front of a user wearing the headset 102 and the cue 164, which can be overlaid on, superimposed upon, or otherwise integrated with the viewfinder image 163 guiding the user to align the user's palm at a position 154 within the field of view 166 of the camera 103. Also, the sequence includes capturing a set of images of a palm in the field of view 166 using the camera 103. The sequence of operations includes processing the set of images to determine a set of identifying features of the palm. Also, the sequence of operations includes comparing the set of identified features with enrolled palm prints to identify the palm.

Figure 7A:
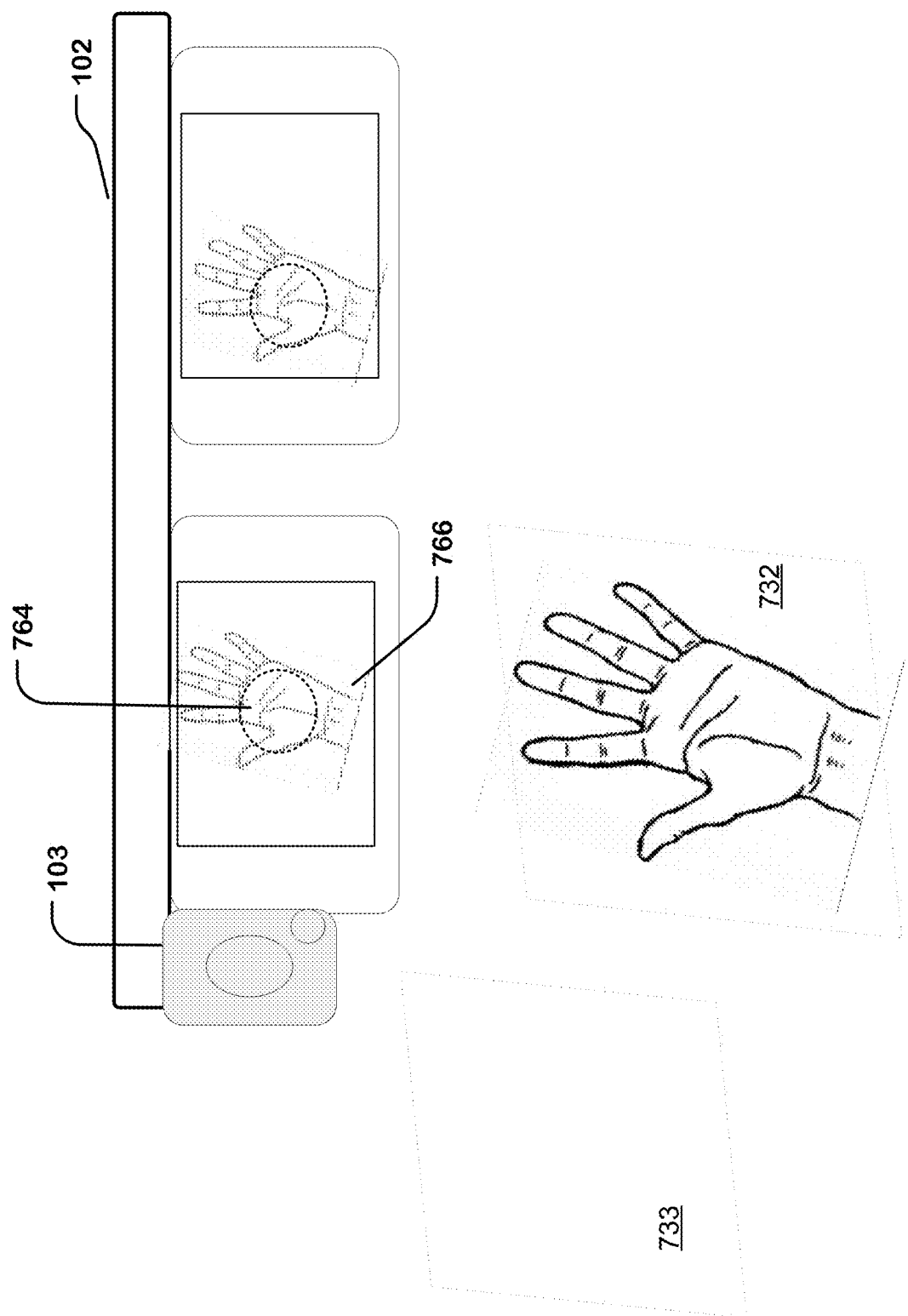
FIG. 7A illustrates example of displaying a cue to guide the user in placing a palm for palm identification guidance in an example implementation.

As will be described in further detail below with reference to FIG. 7 and FIG. 8, some implementations will also include separating from the image stream provided by the camera, an image portion of the images that contains the palm. The image portion can be scaled by a scaling factor. The image portion can be shifted by an offset to make the image portion appear to the user to be placed in front of the user and coincident with the view finder image. In response to successful palm authentication, a signal is generated to enable further operations of a virtual reality or augmented reality headset.

Presentation of cue 164 can be stereoscopic or otherwise. Further, cue 164 may be of different size or shape than circular region 154. For example, cue 164 could be presented to be large enough to fit the entire hand of the wearer. In another example, cue 164 can include an icon like representation for the hand, rather than simply a circle or other geometric shape. The icon like representation for the hand can include fingers. The direction of the cue 164 can point to a preferred orientation for the hand, prompting the wearer to orient their hand appropriately. Providing a cue to facilitate proper positioning and/or alignment of the palm with the camera can enable some implementations to achieve more accurate authentication results. One measure of accuracy is a number of correct authentications divided by a total number of authentications. A second definition of accuracy is a number of users authenticated correctly divided by a total number of users attempting to be authenticated. Conducting image processing on at least image portions enables implementations to provide users with a more realistic user experience by adjusting the view of the palm to account for offsets between position of the camera and center of the user's field of vision and/or between position of the camera relative to the hand and the position of the user's eyes relative to the position of the hand.

Providing palm recognition and authentication techniques as described herein can enable some embodiments to control access to applications. Some embodiments can use palm recognition and authentication techniques as described herein to control access to certain functionality of the headset. Many embodiments can use palm recognition and authentication techniques as described herein to control access to further processes and/or control access to other devices. Embodiments can offer improvement over tactile forms of authentication such as fingerprint sensing, especially in environments where transfer of germs or dust are at issue (e.g., operating rooms, semiconductor clean rooms)

In some implementations, headset 102 includes an illumination source 165 on the front side with the lens of the camera configured to capture a field which encompasses a region 167 in which the palm can be held by the wearer of the headset 102. The illumination source according to embodiments described herein has an emission spectrum configured to facilitate and/or enhance the detection of palm features by the system. For example, in one embodiment, multi-modal palm feature recognition is implemented in which different emission spectra are employed in capturing different palm features. In one implementation, multi-modalities include recognizing a palm print using a first detection modality, e.g., visible light spectrum lighting and camera, and recognizing palm vein(s) using a second detection modality, e.g., infra-red spectrum lighting and camera. A combination of a result of the first detection modality and the second detection modality can enable multi-modal recognition capable embodiments to achieve greater accuracy in detection. In a yet further implementation, predominantly wavelengths less than 485 nm. are used to illuminate the palm with the illumination source 165. Using an emission spectrum including wavelengths in a range less than 485 nm, facilitates detection using cameras with sensitivity in the blue/violet or near ultraviolet range. The processing of the set of images to determine a set of identifying features of the palm can be according to intensity gradients in the wavelength range of the illumination source 165.

In various implementations, the controller 150 connected to the headset 102 can be integrated into headset 102, a separate device from headset 102, or implemented using other computing devices that can be a touch pad, mobile telephone, laptop, desktop, smart TV, etc. Functions of controller 150 can be implemented in hardware, software or combinations thereof.

Figure 2:
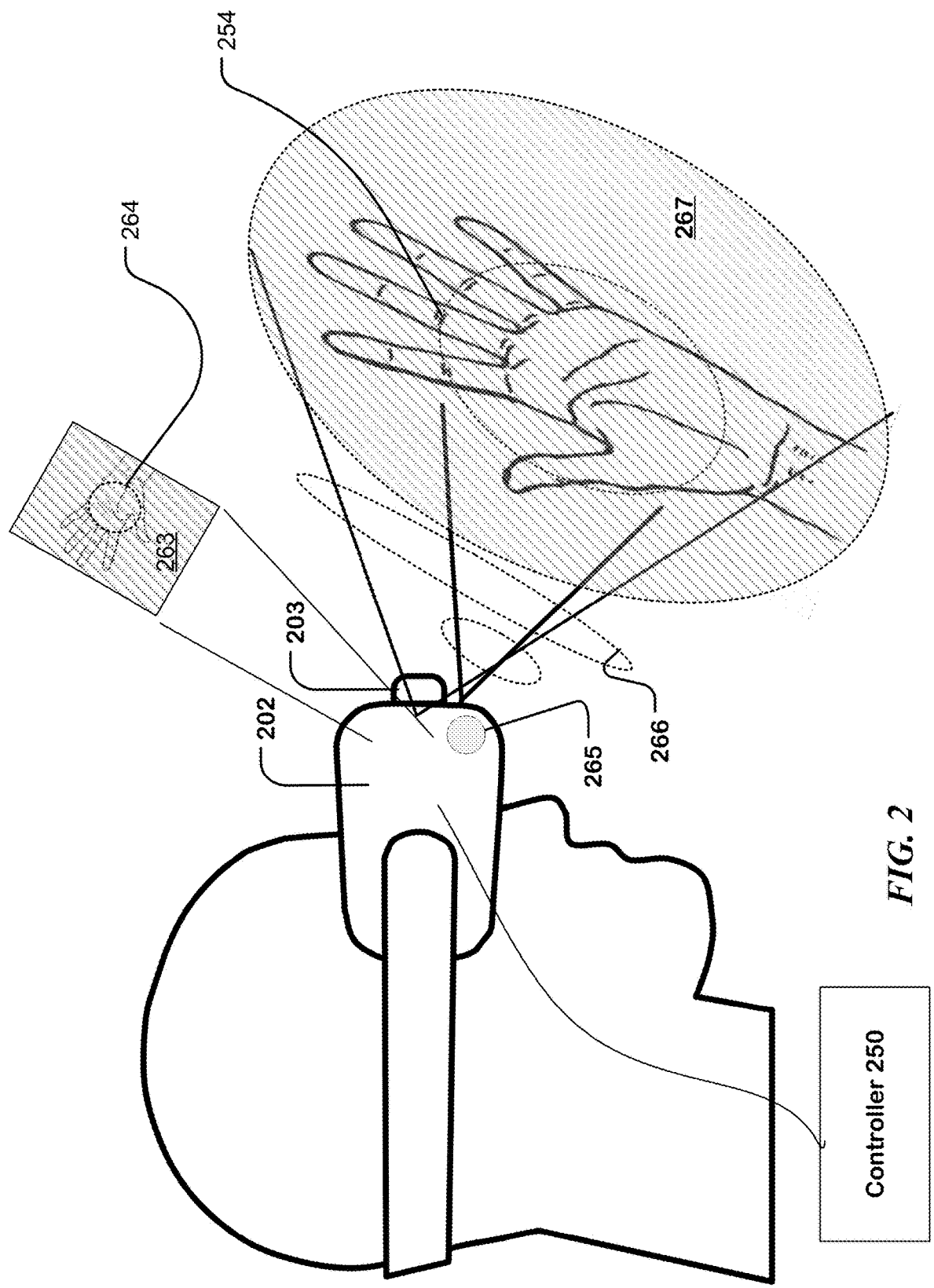
FIG. 2 illustrates another computing device having a head mounted display (HMD) and a user interface that comprise a viewfinder image of a camera and a cue as described herein.

FIG. 2 illustrates an alternative embodiment, in which a video-see-through headset 202 can be used for virtual reality and augmented reality functions. The headset 202 includes at least one forward facing camera 203 having a lens (not shown) with a field of view 266, and a display screen (not shown) inside headset 202. A front surface of headset 202 may be opaque. Accordingly, forward visibility, if any is provided, is provided by camera 203 capturing images of the environment in front of the user and providing live or near live video feed to the user across a display screen inside the headset 202. The field of view 266 of the camera 203 is a region forward of the headset 202 in this example.

A viewfinder image 263 produced by the camera is displayed on the display screen inside headset 202. A cue 264 is overlaid upon the viewfinder image 263 in order to guide the user to place the user's palm at a position (and orientation) within the field of view of the camera 203 that facilitates the capturing and matching of palm prints. In some embodiments, the cue 264 is limited to a region, such as the circular region 254 shown in the drawing. The cue 264 can be include an open area in which to position the user's palm or can be semi-transparent.

The headset 202 includes an illumination source on the front side with the lens of the camera configured to illuminate a field which encompasses a region 267 in which the palm can be held by the wearer of the headset 202. The illumination source 265 according to embodiments described herein has an emission spectrum configured to facilitate and/or enhance the detection of palm features by the system. For example, in one embodiment, multi-modal palm feature recognition is implemented in which different emission spectra are employed in capturing different palm features. In one implementation, multi-modalities include recognizing a palm print using a first detection modality, e.g., visible light spectrum lighting and camera, and recognizing palm vein(s) using a second detection modality, e.g., infra-red spectrum lighting and camera. A combination of a result of the first detection modality and the second detection modality can enable multi-modal recognition capable embodiments to achieve greater accuracy in detection. In a yet further implementation, predominantly wavelengths less than 485 nm. are used to illuminate the palm with the illumination source 265. Using an emission spectrum including wavelengths in a range less than 485 nm, facilitates detection using cameras with sensitivity in the blue/violet or near ultraviolet range.

The headset 202 is a computing device or is connected wirelessly or by cable to a computing device, e.g., controller 250 that includes logic to execute the sequence of operations to perform palm print authentication as discussed above. In response to successful palm authentication, a signal is generated to enable further operations of a virtual reality or augmented reality headset.

Figure 3A:
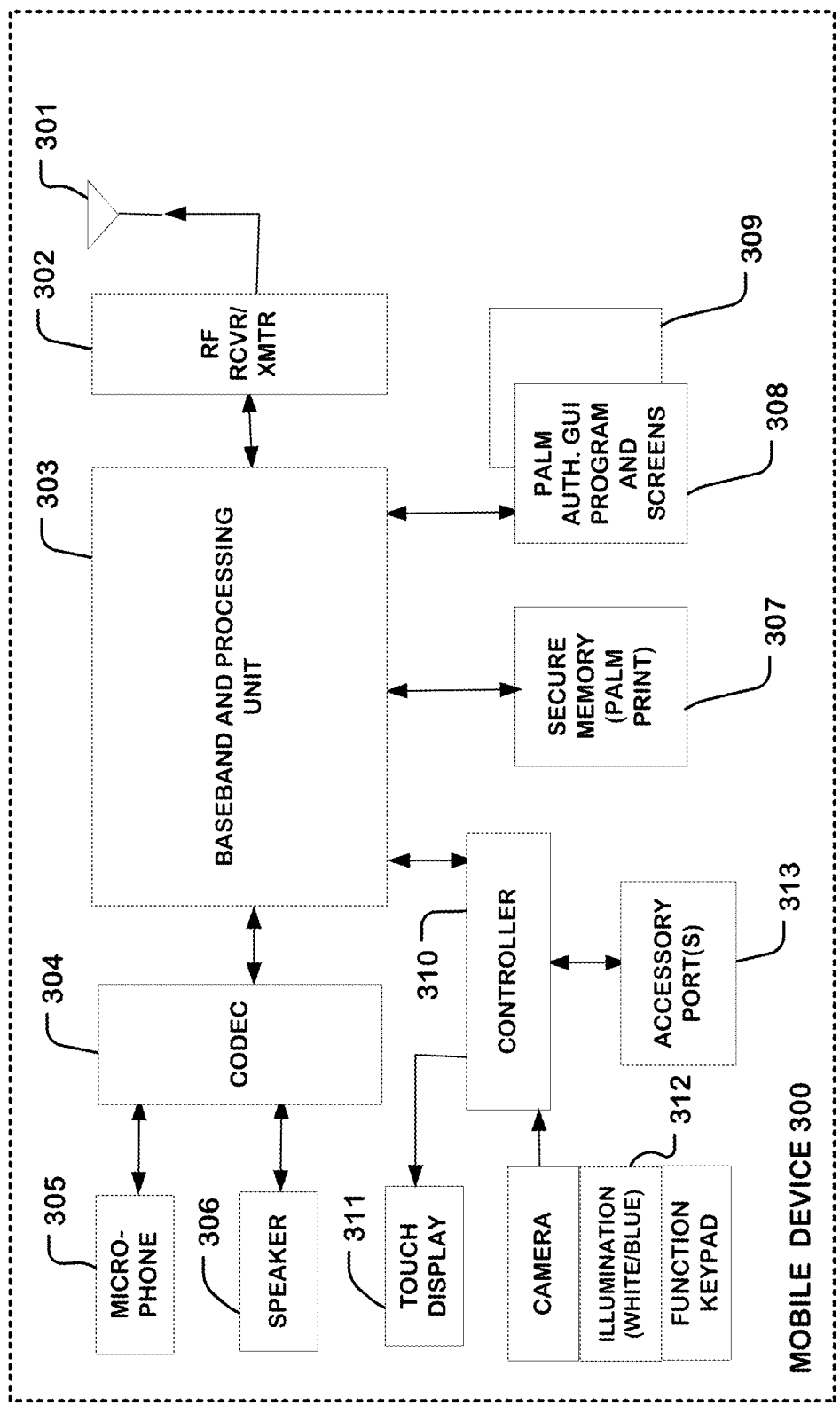
FIG. 3A is a simplified block diagram of a processing platform suitable for a mobile computing device, including resources for palm authentication as described herein.

FIG. 3A is a simplified diagram of a mobile phone computing platform 300, representative of computing devices which can be used as an apparatus for palm authentication described herein. Other computing devices configured for palm authentication, as described herein, can have a similar platform, including devices which can be modular in form factor for deployment in a variety of settings, and that are configured for communication with local servers, and devices that are configured for wireless communication via the internet, rather than the mobile phone network.

In this example, the computing platform 300 includes an antenna 301 and a radio including a radio frequency RF receiver/transmitter 302, by which the computing platform 300 is coupled to a wireless communication medium, according to one or more of a variety of protocols. In examples described herein, the RF receiver/transmitter 302 can include one or more radios to support multiprotocol/multiband communications for communication with the wireless service provider of the mobile phone network, as well as the establishment of wireless local radio links using a protocol like Bluetooth® or WIFI protocols. The receiver/transmitter 302 is coupled to baseband circuitry and a digital processor in processing section 303, in which the audio signals are processed and call signals are managed. A codec 304, including analog-to-digital and digital-to-analog converters, is coupled to the processing section 303. A microphone 305 and a speaker 306 are coupled to the codec 304.

Memory 307 which can be a nonvolatile read-only memory, stores a palm print or set of palm prints for use in an authentication algorithm, as well as instructions, parameters and other data for execution by the processing section 303. In addition, a read/write memory 308 in the mobile phone stores instructions and parameters for palm print authentication processes and other data for use by the processing section 303. There may be multiple types of read/write memory on the computing platform 300, such as nonvolatile read/write memory 308 (flash memory or EEPROM for example) and volatile read/write memory 309 (DRAM or SRAM for example). Other embodiments include removable memory modules in which instructions, parameters and other data for use by the processing section 303 are stored.

An input/output controller 310 is coupled to a touch sensitive display 311 and to user input devices 312, such as a camera, a function keypad, and an illumination source. The camera can be used to capture images for the palm print authentication, and the illumination source can provide illumination in a field of view of the camera in the blue/violet/UV range as discussed above. An accessory port or ports 313 coupled to the controller 310 are used for other types of input/output devices, such as binaural and monaural headphones, connections to processing devices such as PDAs, or personal computers, alternative communication channels such as an infrared port or universal serial bus USB port, a portable storage device port, and other things. The controller 310 is coupled to the processing section 303. User input concerning call set up and call management, and concerning use of the palm print authentication, user preference and ambient light factors is received via the input devices 312 and optionally via accessories. User interaction is enhanced, and the user is prompted to interact, using the touch display 311 and optionally other accessories. Input may also be received via the microphone 305 supported by voice recognition programs, and user interaction and prompting may utilize the speaker 306 for various purposes.

In the illustrated embodiment, memory 308 stores a program for displaying a function selection menu user interface on the display 311, such that the user can select the functions to be carried out during the generation of palm print authentication profiles discussed herein. Also, instructions executable by the processing section 303 and/or the controller 310, are stored in a non-transitory medium such as the memory 307, 308, 309, that includes logic for executing the sequence of operations outlined above in connection with FIGS. 1 and 2.

In general, the sequence of operations executed by logic in the computing platform operates as follows. When a presence of a user's hand is detected, a detection module of the logic evaluates its location, scale and orientation in each frame, and produces a palm image for preprocessing. A preprocessing module of the logic receives the palm image, aligns it with the template palm image using a geometric transform and extracts features. A palm template stored in a database or other data storage system is comprised of a palm image of a registered person (e.g., a person known to the system through capture of the person's biometric identity), and features extracted from the imaged palm.

An optimal set of parameters such as the number of features on the template, and the matching criterion value can be determined to satisfy requirements specified for a FAR (false acceptance rate) and a FRR (false rejection rate).

Figure 3B:
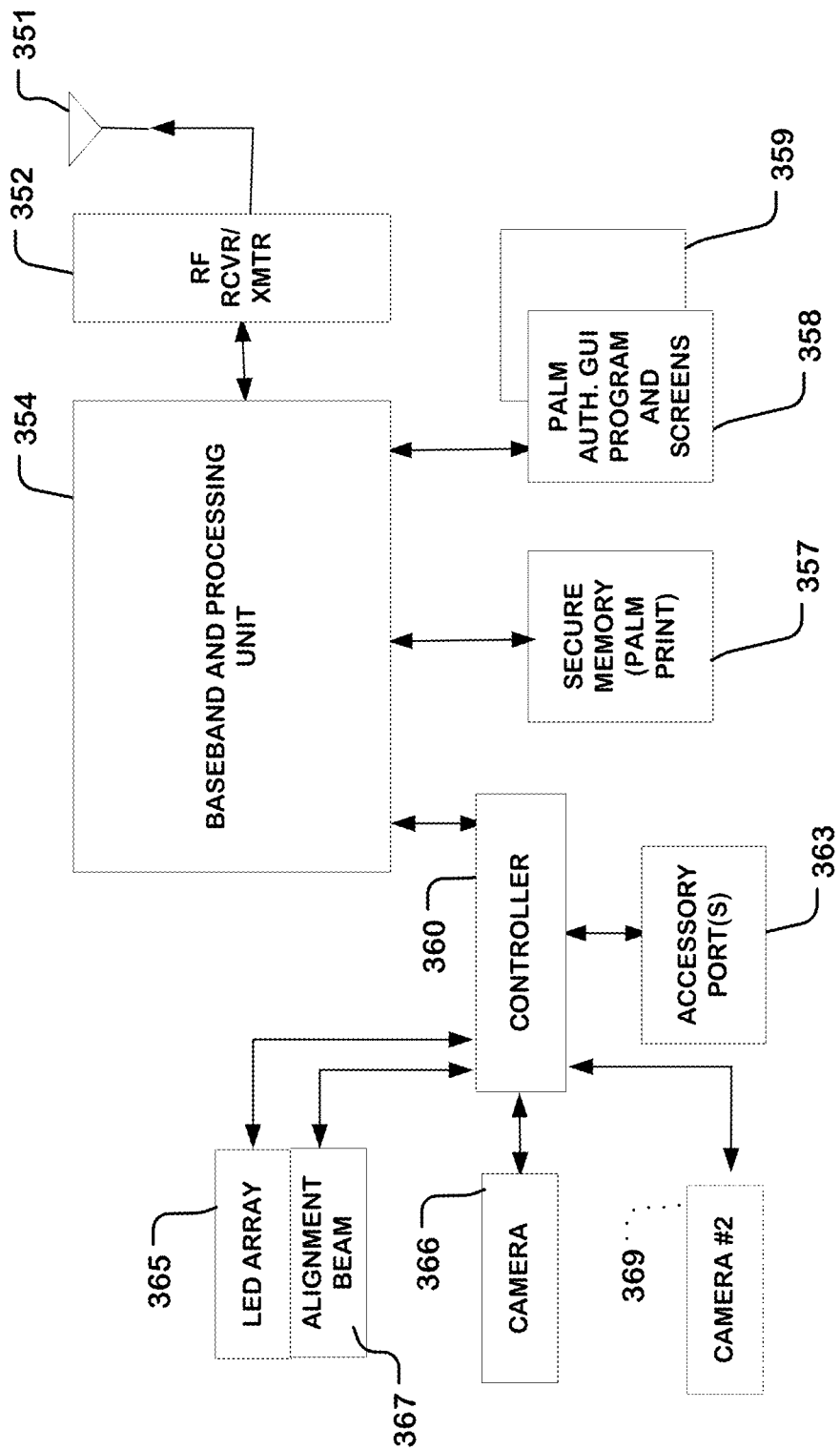
FIG. 3B is a simplified block diagram of an alternative processing platform suitable for a computing device without a display, including resources for palm authentication as described herein.

FIG. 3B is a simplified diagram of an alternative computing platform 350, representative of computing devices which can be used as an apparatus for palm authentication described herein. In this example, the computing platform does not include a display, and includes an alignment system based on an alignment beam. Other computing devices configured for palm authentication, as described herein, can have a similar platform, including devices which can be modular in form factor for deployment in a variety of settings, and that are configured for communication with local servers, and devices that are configured for wireless communication via the internet, and/or the mobile phone network. In some embodiments, the computing platform is in a separate module than the camera, or than the camera and the illumination source. For example, when deployed on an automobile having cameras mounted thereon for safety and self-driving, the computing device can be in wired or wireless electrical communication with the existing camera and an illumination source, and utilize the existing camera for authentication images.

In this example, the computing platform 350 includes an antenna 351 and a radio including a radio frequency RF receiver/transmitter 352, by which the computing platform 350 is coupled to a wireless communication medium, according to one or more of a variety of protocols. In examples described herein, the RF receiver/transmitter 352 can include one or more radios to support multiprotocol/multiband communications for communication with wireless local radio links using a protocol like Bluetooth® or WIFI protocols. The receiver/transmitter 352 is coupled to baseband circuitry and a digital processor in processing section 354, in which the video signals are processed and other logical functions are carried out using computer programs stored on the device.

Memory 357 which can be a nonvolatile read-only memory, stores a palm print or set of palm prints for use in an authentication algorithm, as well as instructions, parameters and other data for execution by the processing section 354. In addition, a read/write memory 358 in the mobile phone stores instructions and parameters for palm print authentication processes and other data for use by the processing section 354. There may be multiple types of read/write memory on the computing platform 350, such as nonvolatile read/write memory 358 (flash memory or EEPROM for example) and volatile read/write memory 359 (DRAM or SRAM for example). Other embodiments include removable memory modules in which instructions, parameters and other data for use by the processing section 354 are stored.

A controller 360 is coupled to a camera 366, optionally a second camera 369, and an illumination source such as LED array 365. The LED array 365 provides emissions with an emission spectrum in a range appropriate to the functioning of the camera 366, and optionally second camera 369 below 485 nm. In some embodiments, the illumination source may be a broadband light. In other embodiments, the emission source can be an infra-red range. In a multi-modality embodiment, in which the camera 366 can be used to capture images for the palm print authentication using visible light, and the illumination source can provide illumination in a field of view of the camera 366 in the visible range, and the optional second camera 369 can capture images using infrared illumination for palm vein authentication. In one embodiment, LED array 365 provides broad spectrum light that is filtered by means of filters to provide different illumination spectra appropriate to respective cameras 366, 369 as discussed above. In another embodiment, LED array 365 includes elements that provide different emission spectrum on command under control of the controller 360. The controller 360 is coupled to an alignment beam generator 367 such as a laser, or components used in combination with the LED array 365, to provide an alignment indication light in the field of illumination of the LED array 365.

The controller 360 is coupled to the processing section 354. User input concerning use of the palm print authentication can be provided via the wireless receiver. In some embodiments, a switch or keypad is provided by with the palm authentication procedure can be initiated. Input may also be received via a microphone supported by voice recognition programs, and user interaction and prompting may utilize a speaker for various purposes. An accessory port or ports 363 coupled to the controller 360 are used for other types of input/output devices, such as binaural and monaural headphones, connections to processing devices such as PDAs, or personal computers, alternative communication channels such as an infrared port or universal serial bus USB port, a portable storage device port, and other things.

In the illustrated embodiment, memory 358 stores a program for functions to be carried out during the generation of palm print authentication profiles discussed herein. Also, the instructions executable by the processing section 354 and/or the controller 360, are stored in a non-transitory medium such as the memory 357, 358, 359, that includes logic for executing the sequence of operations outlined above in connection with FIGS. 1 and 2. The platform shown in FIG. 3B can be deployed in settings utilizing authentication to enable further operations, including signaling a machine to open a door, turn on a machine, and to preform operations customized to the authenticated person.

The technology disclosed can be implemented in the context of any computer-implemented system including an on-premises networked system, a cloud computing environment, hybrid approach, or the like. Moreover, this technology can be implemented using two or more separate and distinct computer-implemented systems that cooperate and communicate with one another. This technology can be implemented in numerous ways, including a process, a method, an apparatus, a system, a device, a computer readable medium such as a computer readable storage medium that stores computer readable instructions or computer program code, or as a computer program product comprising a computer usable medium having a computer readable program code embodied therein.

The technology disclosed can be implemented in the context of any computing device, including a mobile phone or smart phone and a processing module suitable as a subassembly on a wide variety of systems. Such a computing device can include or have access via a communication network a database system storing biometric information used to authenticate individuals. Biometric information can be stored and managed using cloud based storage approaches, a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation.

In addition, the technology disclosed can be implemented using different programming models like MapReduce™, bulk synchronous programming, MPI primitives, etc. or different stream management systems like Apache Storm™, Apache Spark™, Apache Kafka™, Truviso™, IBM InfoSphere™, Borealis™ and Yahoo! S4™.

The technology disclosed is described herein using representative examples implementing palm print identification. A representative implementation contains two pipelines or work flows: identification and enrollment. First, the identification pipeline will be described with reference to example processes. Second, the enrollment pipeline will be described with reference to an implementation that uses a subset of the identification processes.

Identification

Figure 4:
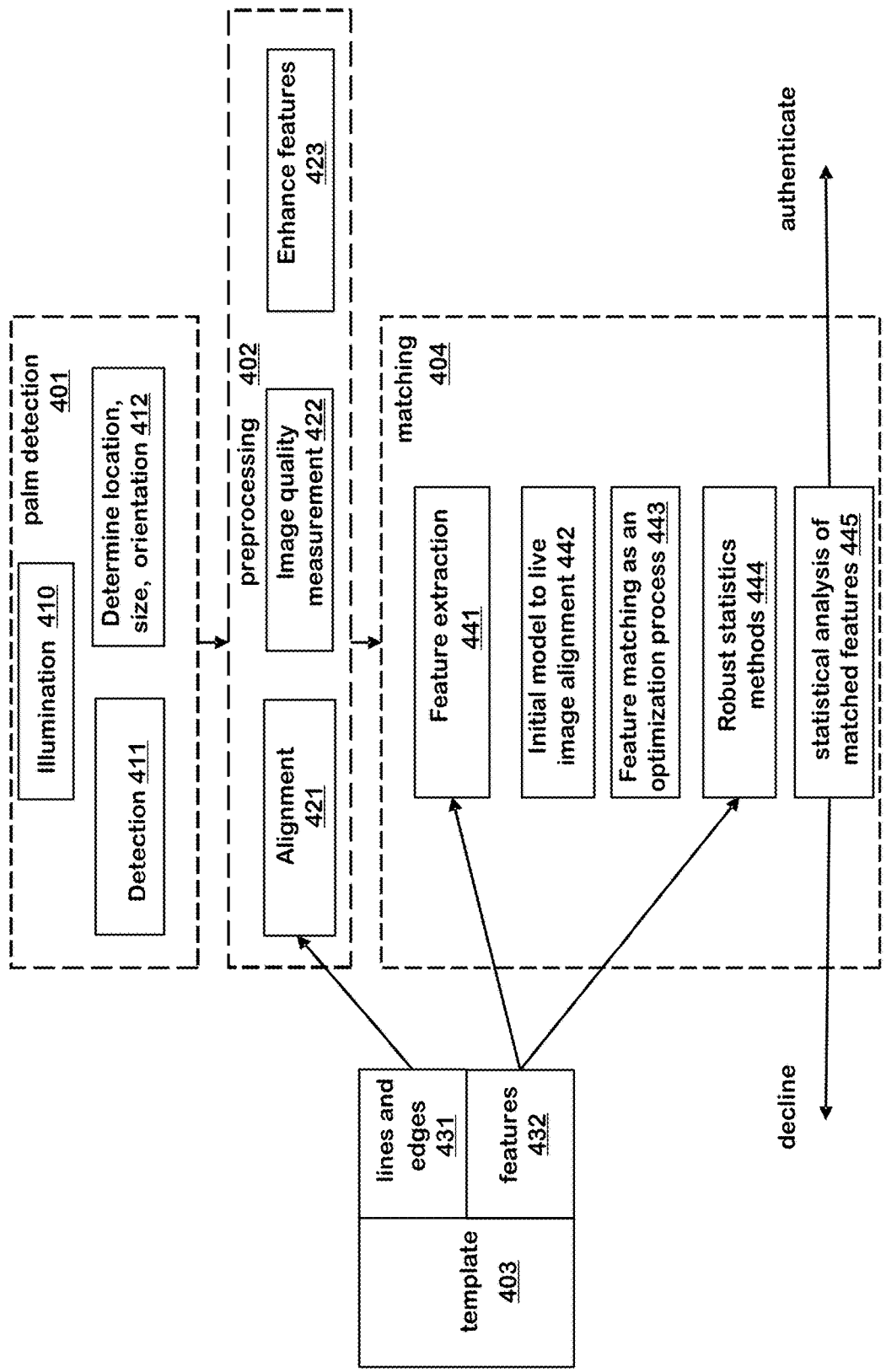
FIG. 4 illustrates an overview of an example implementation of palm detection, preprocessing and matching.

FIG. 4 illustrates an overview of an example implementation of palm detection, preprocessing and matching. A Palm detection operation 401 includes illumination 410 in the target wavelength range, detection processing 411 and determination 412 processing that determines features of the palm, including location, size and orientation. Images in which a palm is detected by palm detection operation 401 are input to a preprocessing operation 402. Preprocessing operation 402 includes processes such as alignment process 421, image quality measurement process 422, and feature enhancement process 423.

1. Detection

The logic on the computing platform, or accessible by the computing platform can include a palm detection operation 401. Detection of a human hand for example, in some embodiments includes determining whether a palm of an appropriate shape, size and orientation is present in the current frame of a video image. If no suitable palm is detected, no further processing is performed for the current frame and the current frame will be discarded. Otherwise, the system localizes the region of interest (ROI)—an approximately rectangular shape (or other suitable shape) that contains at least a region of the detected palm. Next processing includes providing visual feedback, which in one example implementation includes superimposing a viewfinder image from the camera video stream within a specified region in the frame of the user interface, and optionally overlaid with a feature (e.g. a rectangle, ellipse or circle) to indicate the region of interest (ROI) of the palm detected from the video stream. Next, the image frames in a set of image frames are sent along with the detected ROI information to a subsequent processing engine.

2. Image Preprocessing (Denoising, Deblurring)

The logic on the computing platform, or accessible by the computing platform can include an image preprocessing operation 402. An example process includes an operation for capturing an input of N substantially consecutive frames with detected palm ROIs detected by the detection processing described herein. These N images can be aligned (421) by aligning one or more features that have been located within the ROIs of respective images. A composited image is formed from the aligned images by averaging, which represents a computed output image. This output image can be sharper and contain less noise than any of the input images inside the palm ROIs (the background can actually become blurrier).

Note that one implementation of the system averages the aligned images. In other implementations, we can use other techniques where the images are combined using some weight function that can depend on image quality, time, alignment quality, etc. Noteworthy is that high quality images, when captured, enable certain implementations to use single image frames and omit averaging of images altogether.

In another implementation, an image quality measurement process 422 is performed in which the output image is subjected to one or more quality metrics. Thresholds of quality metrics can be computed and applied to the output image. So, for example, if the output image is too dark, or not sharp or clear enough, the output image is rejected and not passed to the remainder of the pipeline.

After denoising and deblurring, an additional preprocessing that can enhance palm lines and other structural features 423 may be applied. Possible enhancement techniques include but are not limited to: (1) Fourier or wavelet based methods that enhance high frequency component of the image such as described by Khatkar et al., "Biomedical Image Enhancement Using Wavelets," International Conference on Computer, Communication and Convergence, 17-28 Dec. 2014, Procedia Computer Science 48, pp 513-517, (2) structural filters that enhance particular structures (lines, cross-sections, etc.) in the image such as described by Frangi et al. "Multiscale vessel enhancement filtering," MICCAI '98, v. 1496, Springer Verlag, Berlin, Germany, 11 Oct. 1998, pp. 130-137.

3. Feature Extraction

The logic on the computing platform, or accessible by the computing platform can include a feature extraction operation 441 in the matching logic suite 404. This feature extraction operation takes input of a preprocessed image, then extracts a set of M feature points at positions with distinctive local intensity gradient patterns such as SIFT (Lowe, "Object recognition from local scale-invariant features," Proceedings of the Seventh IEEE International Conference on Computer Vision, Kerkyra, 20-27 Sep. 1999, pp. 1150-1157 vol. 2) (See, "Scale-invariant feature transform," https://en.wikipedia.org/wiki/Scale-invariant_feature_transform, downloaded 30 May 2017, 18 pages), Harris (Harris et al., "A combined corner and edge detector," In Proc. of Fourth Alvey Vision Conference 31 Aug.-2 Sep. 1988, 6 pages.) or corner features such as Harris and Fast (Rosten et al., "Faster and Better: A Machine Learning Approach to Corner Detection," in IEEE Transactions on Pattern Analysis and Machine Intelligence, vol. 32, no. 1, pp. 105-119, January 2010) features. The features are typically extracted within the center region of the detected palm ROIs to guarantee they are inside the palm and do not fall into the background.

3. Model to Live Image Alignment

The logic on the computing platform, or accessible by the computing platform can include a model to live image alignment 442 in the matching logic suite 404. This operation can operate on an alignment model that contains 1) an image of the user's palm captured at enrollment, 2) a rectangle region of the palm ROI, and 3) a set of 2D features extracted from the inside palm. This alignment can be achieved by aligning the two ROIs of the model and live image. Further refinement can be achieved by aligning the internal palm lines and or external palm contours.

Figure 5:
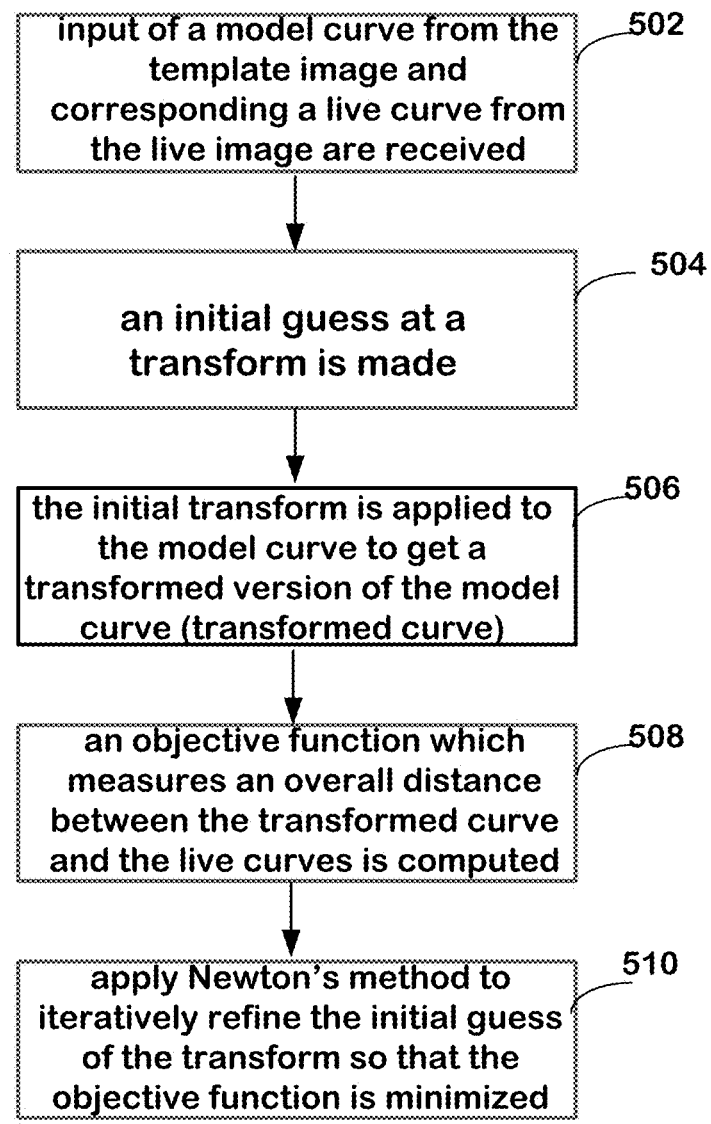
FIG. 5 illustrates a flowchart of an example implementation of an alignment process.

FIG. 5 illustrates a flowchart 500 of an example implementation of an aligning process. Flowchart 500 can be implemented by logic on the computing platform or accessible by the computing platform.

At an action 502, input of a model curve from the template image and corresponding to a live curve from the live image are received.

At an action 504, an initial guess at a transform is made.

At an action 506, the initial transform is applied to the model curve to get a transformed version of the model curve (transformed curve).

At an action 508, an objective function which measures an overall distance between the transformed curve and the live curves is computed. In an implementation, computing an objective function includes: taking sample points along the transformed curve and finding for each sample point a closest point on the live curve; and computing the sum of the square of all distances between the sample point and corresponding points on the live curve. The result of the computed sum of the squares of all distances between the sample point and corresponding points on the live curve is the overall distance between transform curve and live curve.

At an action 510, Newton's method is applied to iteratively refine the initial guess of the transform so that the objective function computed above using the refined transform is minimized. For example:

1. One parameter of the transform is perturbed by a selected amount e.g., step size (delta).
2. A new objective function (e.g., overall distance) is computed using the perturbed transform.
3. A derivative is computed by dividing the difference of the objective function evaluated by subtracting the new one from the old one by the step size.
4. The result will decide whether to continue to move along a positive side or change to a negative direction of the perturbation and the step size of the next iteration.
5. The above can continue with other parameters until the overall distance and/or a change in the overall distance meets or exceeds a threshold.

4. Match Features

The logic on the computing platform, or accessible by the computing platform can include a feature matching 443 in the matching logic suite 404. Using the initial alignment as discussed above, an operation is executed to iteratively refine the matching between the two sets of features to minimize the sum of square distances between corresponding feature points. The matching between the two sets of features is defined by a global transform T. Using T, a model feature point with position p is propagated into the live image at position p'. Then the operation searches around p' for the closest live image feature point q. The distance between p and q under transformation T is |p'−q|.

The nonlinear optimization may converge at a local optimum instead of a global optimum (See, "Local optimum," https://en.wikipedia.org/wiki/Local_optimum, downloaded 30 May 2017, 2 pages.). It may also be negatively impacted by the existence of outliers. To address these issues, robust statistics method such as RANSAC ("Random Sample Consensus (RANSAC)," https://en.wikipedia.org/wiki/Random_sample_consensus, downloaded 30 May 2017, 10 pages.) can be used.

5. Statistical Analysis of the Matched Features

In an implementation, the identification pipeline executed by the logic on the computing platform, or accessible by the computing platform, can provide a determination whether the live hand matches the model based upon using statistical analysis of the matched features 445 in the matching logic suite 404. Robust statistics methods 444 such as techniques to avoid local minima, and to handle outliers. The model can include a user specific model having a template 403, including lines and edges 431 and features 432 in FIG. 4. The iterative optimization outputs a transformation T that defines a global matching between the two sets of feature points. For a model point feature p and a live image feature q, we consider this corresponding pair to be matched when |p'−q| is less than a small threshold. The final decision on whether the palm in the live image matches the model can be made by studying the percentage of model feature points that have corresponding points in the live image matched, as well as the spatial distribution of the matched corresponding feature points, i.e., there should be corresponding feature points in different parts of the palm.

It is noteworthy that the foregoing described method is merely one way of analyzing the offset vectors. In one approach, two parameters are used: a distance threshold to identify valid patch matches and a number threshold to decide a final identity match. By proper selection of these two parameters it is possible to adjust the ratio between a false acceptance rate and a false rejection rate. The statistics underlying this approach and the selection of the parameters will be discussed herein below.

Enrollment

In order to match a live image with a user-specific model, the model is created for that user first. This is the job of the enrollment pipeline, a general overview of which is next described with reference to example implementations. The enrollment pipeline can be performed using a system including computer implemented logic, such as the computing platform 300 or an enrollment server for example, which can provide data derived from the enrollment process for use in the identification sequence.

1. Detection

The logic on the system executing enrollment, or accessible by the system can include a detection operation. Detection processing for enrollment is substantially analogous to the detection processing for the identification pipeline discussed herein above. During enrollment, video image frames of the enrollee's hand are captured and analyzed, including (a) an original image as captured, and (b) an image overlaid with a palm region of interest (ROI) depicted using a rectangle. Detection of a human hand, for example, includes determining whether a palm of an appropriate shape, size and orientation is present in the current frame of a video image. If no suitable palm is detected, no further processing is performed for the current frame and the current frame will be discarded. Otherwise, the system localizes the region of interest (ROI)—an approximately rectangular shape that contains the detected palm. In an implementation, processing includes providing visual feedback, such as for example superimposing a rectangle indicating the ROI overlain with the hand in the displayed video stream. This frame is sent along with the detected ROI information to a subsequent processing engine for denoising and deblurring. One enrollment process implementation can include prompting the user for changing positions of the hand being scanned at intervals as images are captured. In some embodiments, the hand's position can be fixed using a fixture or jig and the illumination can be controlled to take different statistical samples under different lighting environments. These differences can be blocked in statistical analysis of the captured images to obtain tighter statistical windows of confidence. Requirements for image quality and tightness of alignment can be held higher for enrollment processing in order to capture of high quality data. Quality images can provide for better matching during the identification process.

2. Image Preprocessing (Denoising, Deblurring)

The logic on the system executing enrollment, or accessible by the system can include an image preprocessing operation. Image preprocessing for enrollment is substantially analogous to the detection processing for the identification pipeline discussed herein above. Captured video image frames of the enrollee's hand are subjected to substantially identical image preprocessing techniques that take input images, and form an output image that is a composited average of the input images. This output image will be sharper and contain less noise than any of the input images inside the palm ROI (the background will actually become blurrier).

In one implementation, the denoising and deblurring processes during enrollment can be simplified using a jig or fixture to hold the hand in place. When controlled lighting is used during enrollment, averaging and denoising may not be required. Use of quality lighting can provide images that can be suitable for use without applying denoising or deblurring in certain implementations. Image differences can be blocked in statistical analysis of the captured images to obtain tighter statistical windows of confidence. Requirements for image quality and tightness of alignment can be held higher for enrollment processing in order to capture high quality data. Quality images can provide for better matching during the identification process.

3. Feature Extraction

Feature extraction in the enrollment procedure can be performed in the same way as described above for the matching procedure.

4: Extract Palm Outlines and Internal Curves

Palm outlines and internal curves can be extracted from a preprocessed image using a technique based loosely upon Canny edge detection. For further description of Canny methodologies, reference can be had to "Canny edge detector" ("Canny edge detector," https://en.wikipedia.org/wiki/Canny_edge_detector, downloaded 1 Jun. 2017, 6 pages) which is incorporated herein by reference for all purposes. Application environment specifics vary considerably, however, and different and varying techniques for extracting outlines and features in the images will be employed in various implementations.

In an example implementation, high contrast lines e.g., major palm lines can be extracted from the image. Major palm lines can include the creases formed when the human hand is bent or folded, such as the ones used by palmistry artists e.g., life-line, love-line and so forth. Another example of major palm lines are the selection of lines within the palm that represent the deepest lines. In one implementation, corners, outlines and internal curves are captured. In another implementation, the internal curves or corners exclusively are captured. In a further implementation, the outlines exclusively are captured.

5: Save Model

A user specific model (template 403, including lines and edges 431 and features 432 in FIG. 4) comprises a plurality of information items, represented individually, or in combination, that include: (1) a high quality image of the user's palm, (2) the outlines and internal curves of the palm, (3) a rectangle region of the palm ROI, and (4) a set of features extracted using image data detected.

Figure 6:
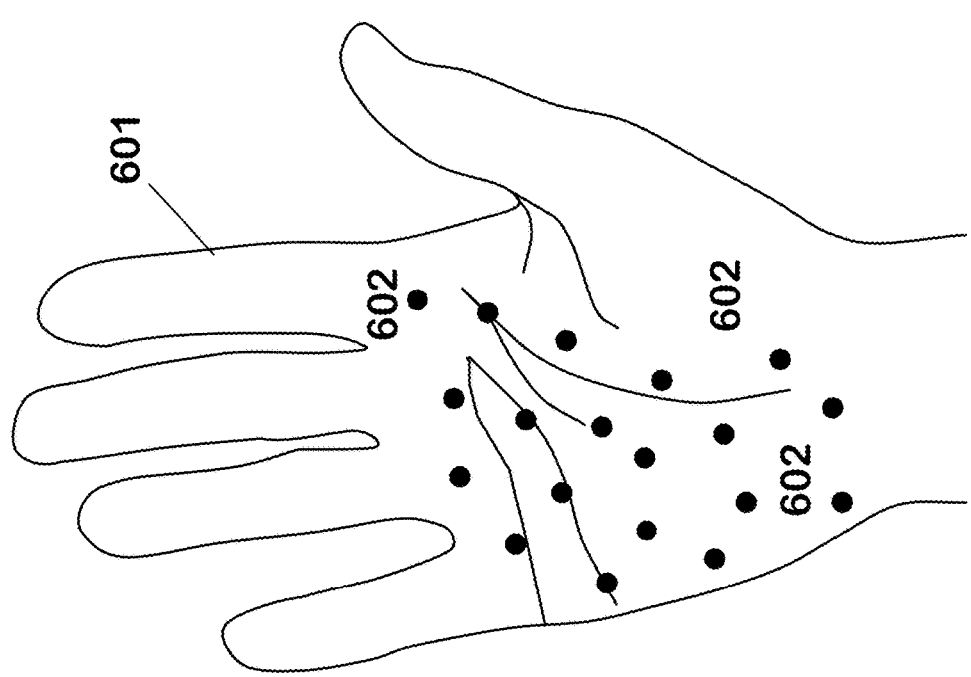
FIG. 6 illustrates features of a palm extracted using the process described herein.

When completed, the result of the enrollment process is a template that can be used to match to live images in order to identify candidates in the matching process. An example is illustrated in FIG. 6, where the outline 601 of the palm and a plurality of locations of features 602 are used to create a template 600 for an authentication process.

Guiding with a Cue

As described previously with reference to FIG. 1 and FIG. 2, a cue can be overlaid upon the viewfinder image in order to guide the user to place the user's palm at a position (and orientation) within the field of view of the camera that facilitates the capturing and matching of palm features. A number of techniques are described herein for providing the cue. In optical see-through headset systems, in which computer-generated imagery is combined with "through the glasses" image of the real world, usually through a slanted semi-transparent mirror, cueing can be provided by an approach illustrated in detail with reference to FIGS. 7A, 7B, and 7C. In an implementation illustrated by FIG. 7A, a stereo 3D guide (cue 764) is displayed without displaying video from camera 103. A user aligns the real image 766 of the user's palm seen-through the semi-transparent lens of the display with the computer-generated imagery of the guide. The goal is to guide the user to position the palm in front of the camera with palm plane 732 roughly parallel to the camera imaging plane 733. In this way, the camera can capture a high-quality imagery of the palm. Specifically, if the camera 103 is positioned on the side of the headset 102, the cue 764 should be displayed to the same side as the camera 103 is positioned. If the camera is tilted (e.g., the HTC Vive™), the cue 764 can be shown to the user as having a tilted angle. In one implementation, an apparent size of 3D cue 764 should roughly match the size of the real palm, such that when the palm aligns with the cue 764, the palm will be of the right size when viewed through the headset 102. For instance, the cue for a child with smaller palms should be smaller and be placed closer to the camera than the cue for a grownup with bigger palms. The size of the 3D cue can be predefined during modeling or derived from hand side determined using e.g., palm detection described herein with reference to FIG. 4.

Figure 7B:
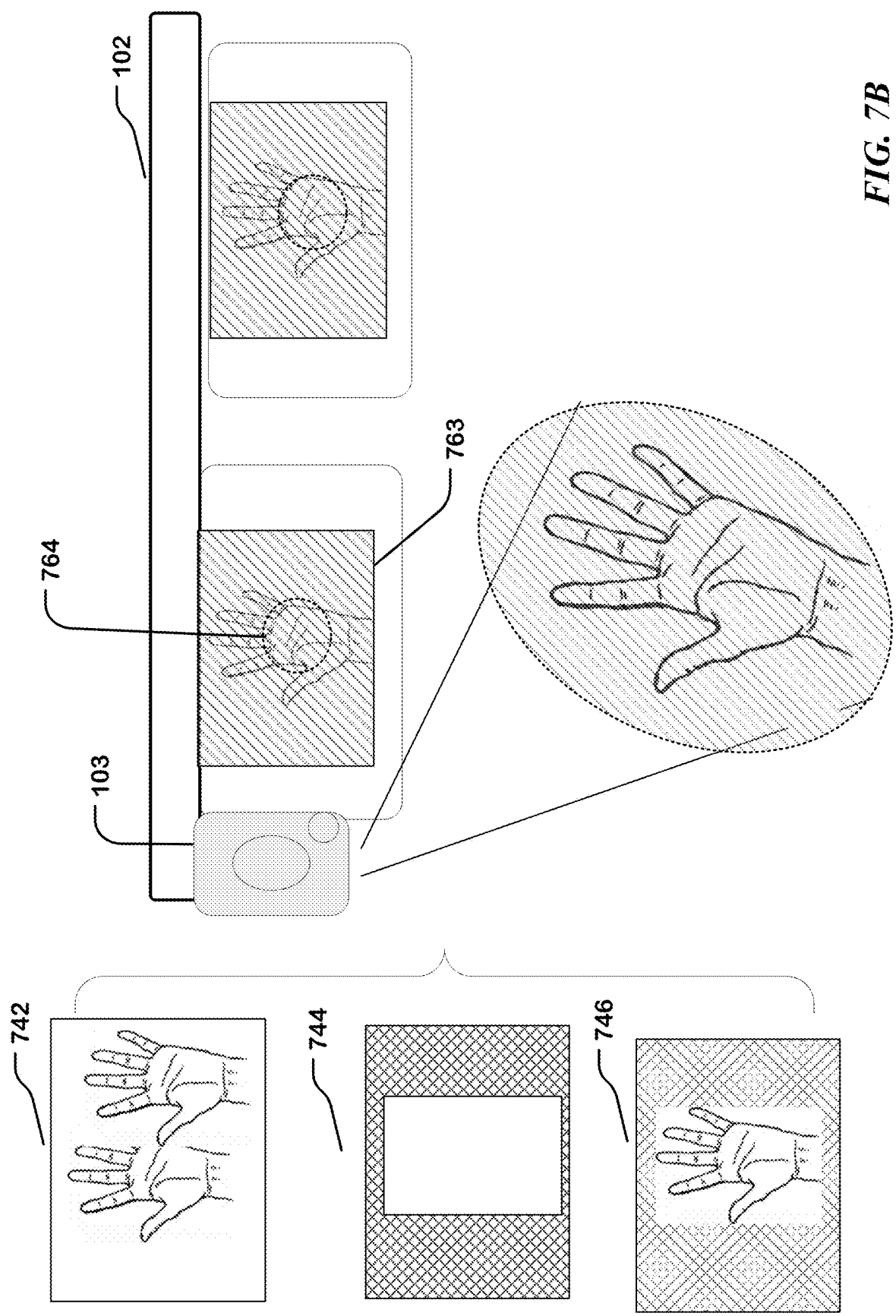
FIG. 7B illustrates example of displaying a cue to guide the user in placing a palm for palm identification guidance in another example implementation.

Now with reference to FIG. 7B, in another implementation, headset 102 displays a viewfinder image 763 comprising live camera video with a cue 764 superimposed on the live video. The user aligns the palm in the video with the displayed cue. One issue is that a conflict in perception arises because the display is semi-transparent, the user sees the "real" environment through the display glass directly and the "projected" environment through the video captured by the camera. This occurs when the user's eye and the camera differ in positions, viewing directions and field of views. The real and projected environments do not align with each other 742. In one implementation, this conflict can be reduced or eliminated by displaying a mask 744 in the peripheral area and only show the live video in a relatively small opening area at the center of the display 746. While depicted in FIG. 7B with a cross hatched pattern, the mask 744 in one embodiment is high intensity (white). This white mask occludes both the real (optical see-through) and the projected (video see-through) environments. By reducing the effective field of view of the user, this display alleviates the perceived conflict. The small opening area 746 can be directly used as the cue 764 as the user is expected to place the user's palm such that it is visible inside the opening area 764.

Figure 7C:
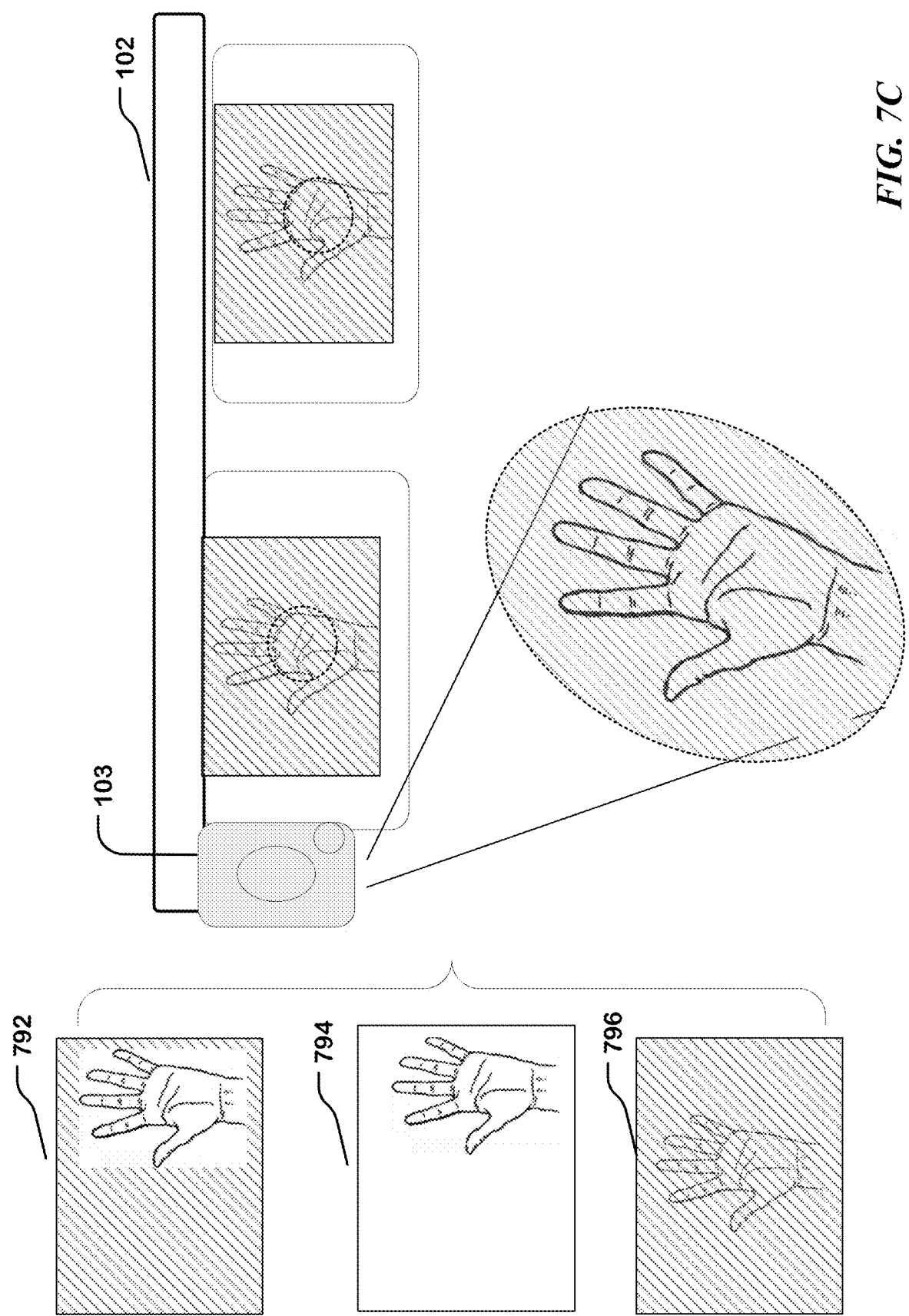
FIG. 7C illustrates example of an offset process for palm identification guidance in an example implementation.

Now with reference to FIG. 7C, in another implementation conflict can be reduced or eliminated by displaying a translated camera video. FIG. 7C illustrates example of an offset process for palm identification guidance in an example implementation. In FIG. 7C, camera 103 of headset 102 is disposed to one side of the headset. So when camera 103 images the user's hand place in the field of view in front of the user, the camera 103 captures images 792 in which palm is to one side of the frame. The controller 150 detects the palm in the image 792 and removes an image portion 794, containing the detected palm, from image 792. The controller 150 applies an offset to the image portion 794 to obtain a more natural view 796 of the palm to display to the wearer in the display of headset 102. In some implementations, in addition to the position offset, a scaling offset and a rotation offset can be determined also and applied to address differences in the field of view angles and viewing directions between the eye and the camera 103.

Figure 8:
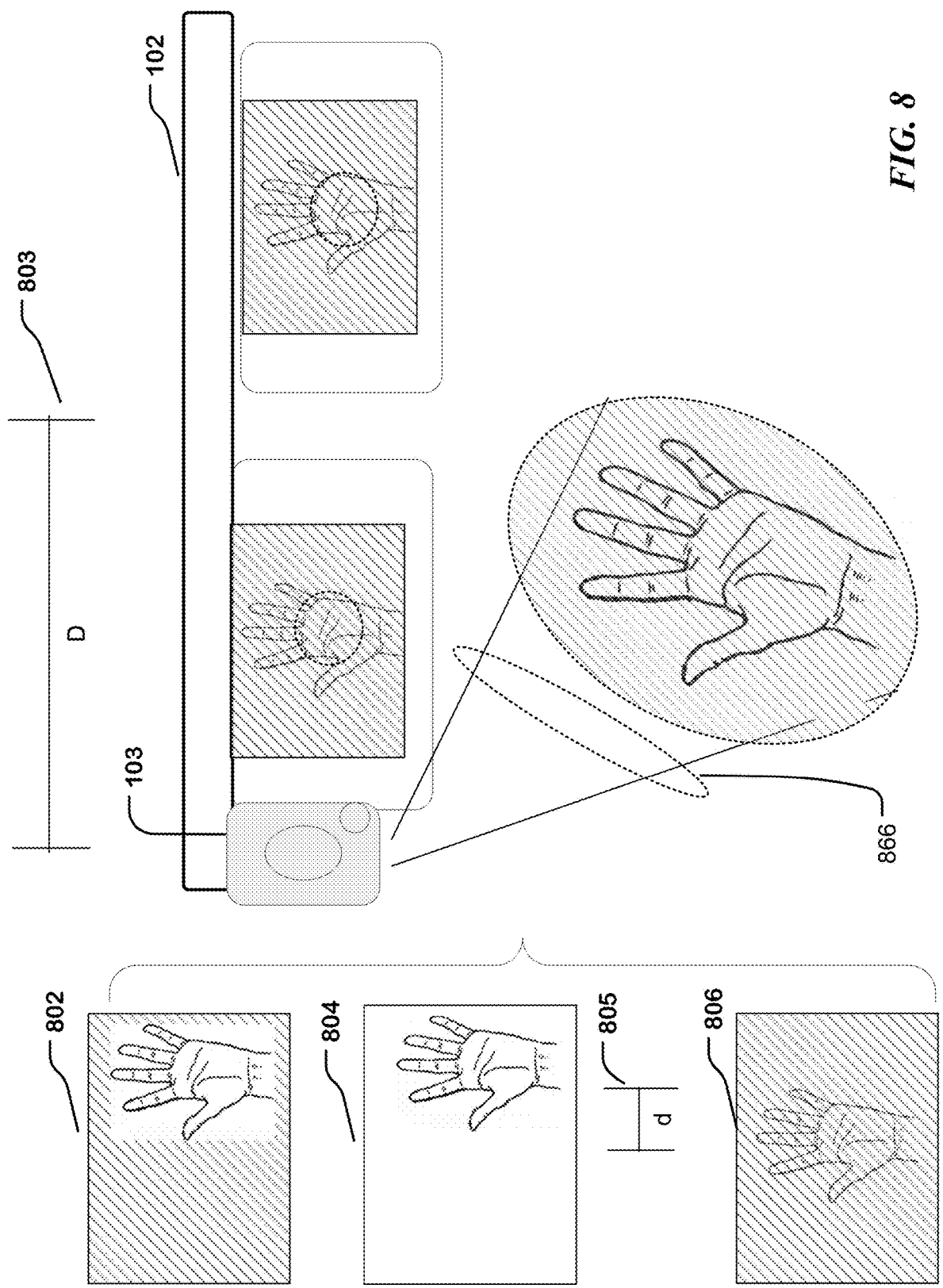
FIG. 8 illustrates a process for offsetting an image portion in an embodiment.

FIG. 8 illustrates a process for offsetting an image in an embodiment. In FIG. 8, a camera 103 with a field of view 866 is offset from a center of headset 102, by a physical offset D (803). In the images 802, 806, an image hand in image 802 is actually captured offset from center image 806 by a screen offset d (805) in the coordinates of the camera 103 when the user holds the hand in front of the headset 102, roughly in the midpoint of the headset. Accordingly, in an embodiment, processing occurs to offset the image 802 by a screen offset of d in order to place the hand approximately in the center of the image 806, which can be displayed to the user wearing the headset 102 in the viewfinder image.

In one embodiment, headset 102 is a computing device or is connected by means of a cable or wireless interface to a computing device, e.g., controller 150 that includes logic to execute a sequence of operations to perform palm authentication. The sequence of operations includes taking the image 802 from the camera with an image portion 804 that contains the palm detected, computing an estimate of screen offset d (805) using the physical offset D (803), the camera field of view 866 and an estimated distance between the camera and the position where the palm is expected to be placed, shifting the image 802 by offset d. The image portion 804 that contains the palm detected is now shifted to 806; thereby making the palm appear to the user wearing the headset to be placed in front of the user wearing the headset and coincident with a point of view of the user wearing the headset without the offset of the camera forming the view finder image.

Figure 9:
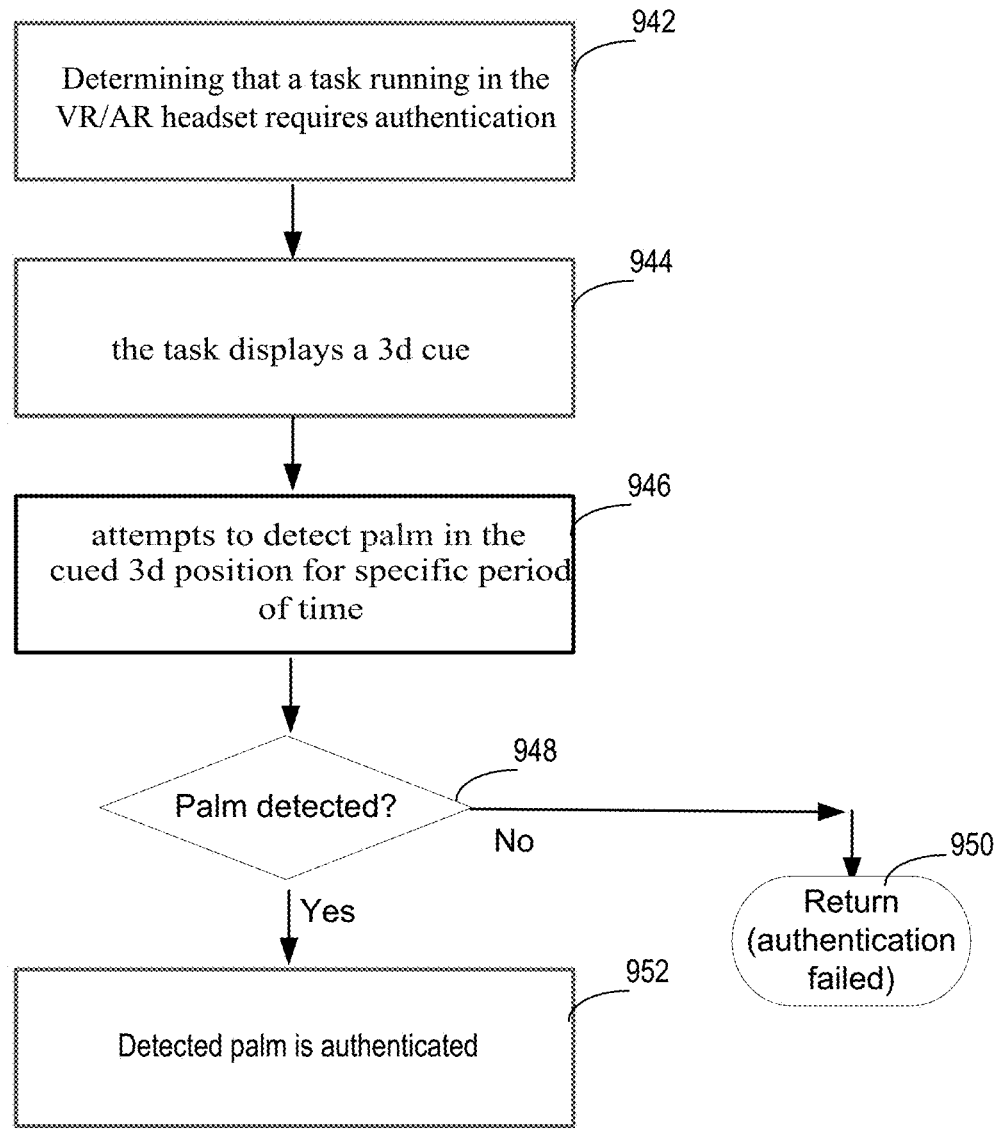
FIG. 9 illustrates a flowchart of an example implementation of an aligning process.
Figure 10:
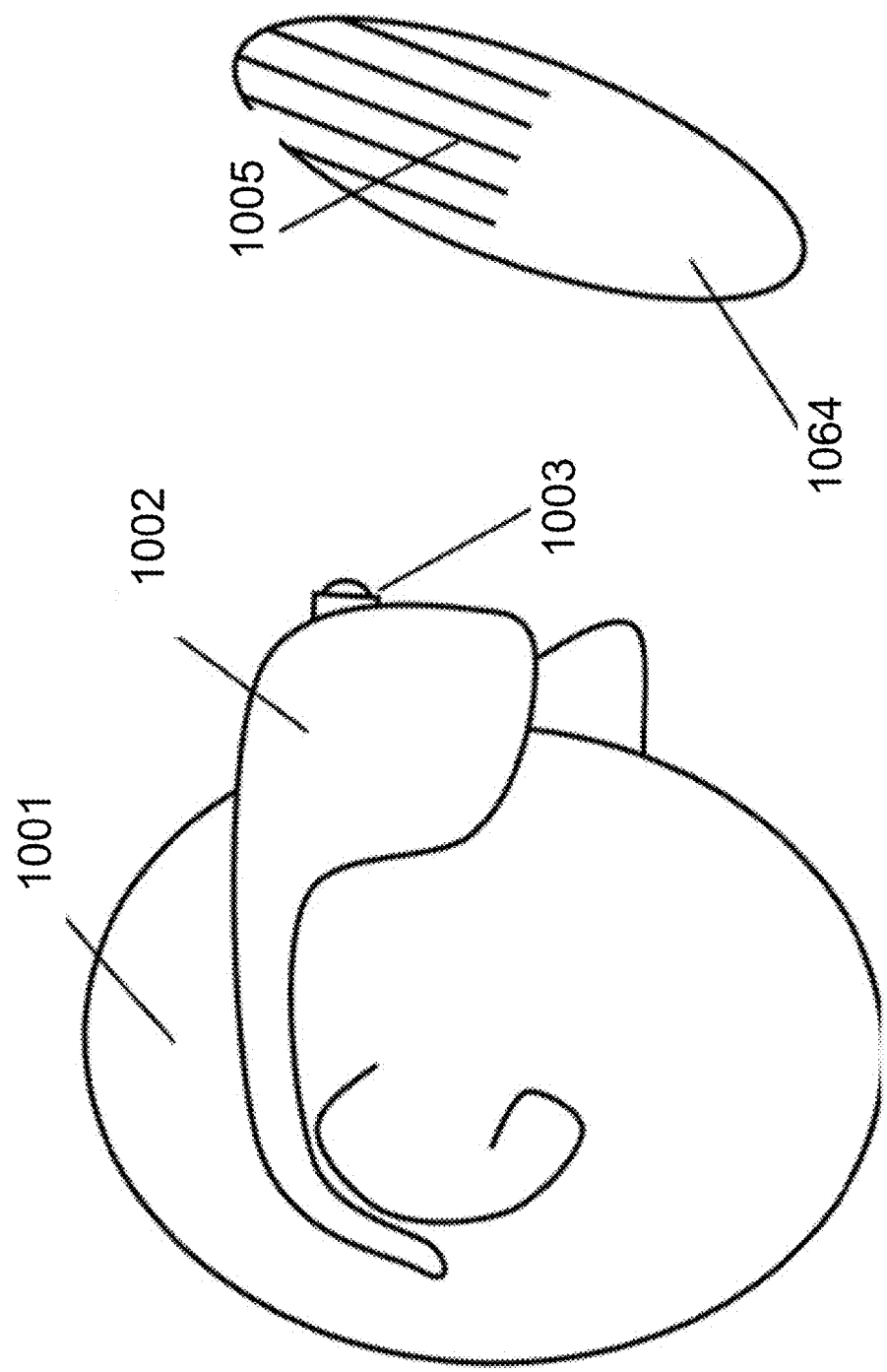
FIG. 10 and FIG. 11 illustrate an example of guiding a user wearing AR/VR headset to place a hand at specific location and orientation with some tolerance.
Figure 11:
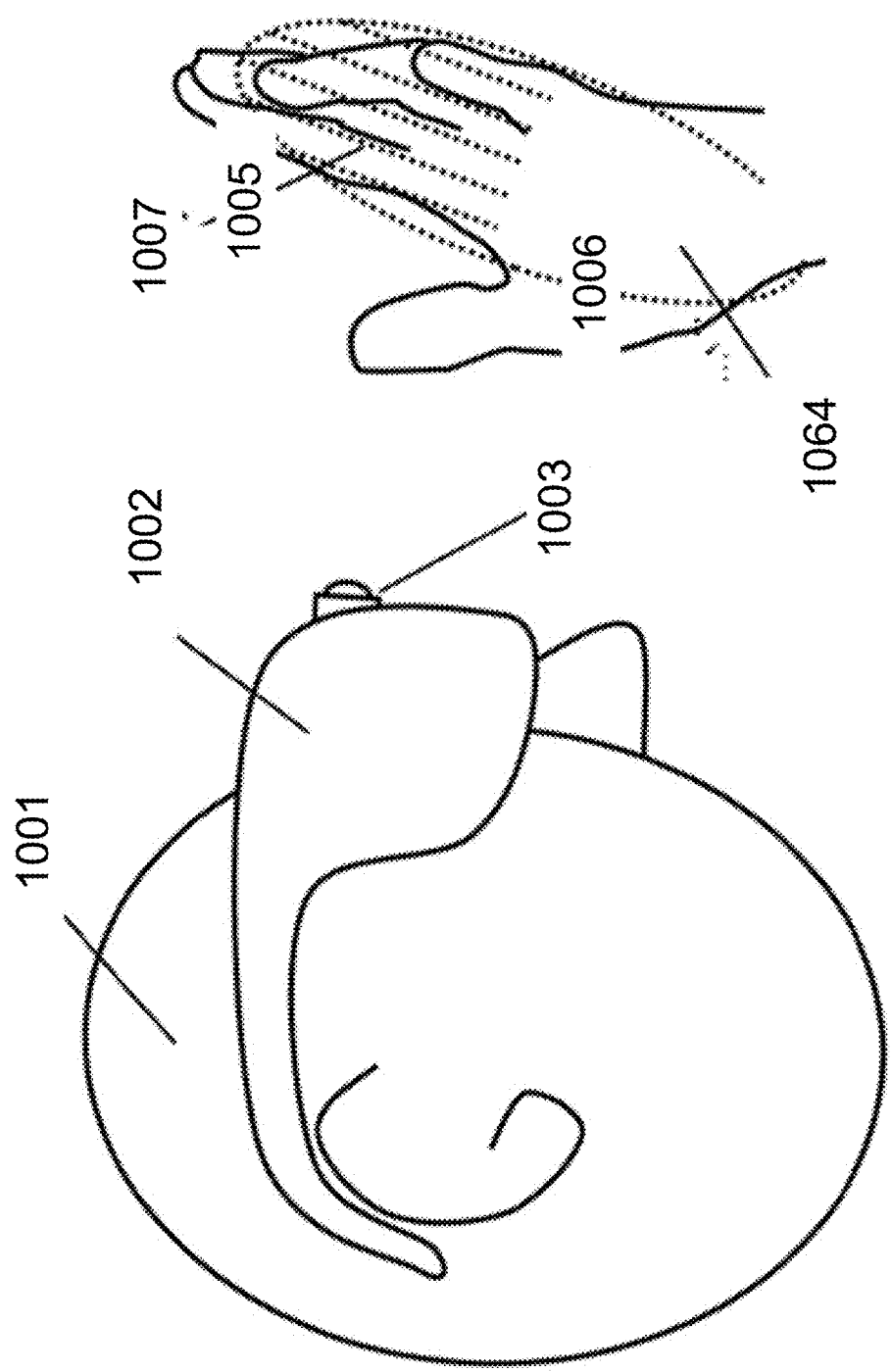

A number of techniques for providing a cue to guide a user in placing a palm for detection described with reference to FIGS. 9, 10 and 11 can be applied to video-see through headset systems, such as illustrated by FIG. 2, in which an opaque front surface blocks view of the outside world except as provided to the user by video feeds from cameras. In an implementation, a viewfinder image is created from a live camera video with a cue superimposed on the live video. (Note that, unlike the discussion with reference to FIGS. 7B and 7C, no conflict in perception exists.) The size of 3D cue should roughly match the size of the real palm, such that when the palm aligns with the cue, the palm will be of the right size in the camera video. For instance, the cue for a child with smaller palms should be smaller and be placed closer to the camera than the cue for an adult with bigger palms. The size of the 3D cue can be predefined during modeling or derived from our palm detection. In another implementation, a viewfinder image is created by shifting the live camera video and displaying the shifted image superimposed with a cue using a sequence of operations depicted in FIGS. 7C and 8. FIG. 9 illustrates a flowchart 900 of an example implementation of an aligning process in conjunction with FIG. 10 and FIG. 11 illustrating an example of guiding a user wearing AR/VR headset to place a hand at specific location and orientation with some tolerance. Flowchart 900 can be implemented by logic on the computing platform or accessible by the computing platform. With reference to FIG. 10, a user is using wearable headset device 102 in conjunction with palm print identification technology embodied by the FIG. 1.

At an action 942, it is determined that a task running in the VR/AR headset requires authentication.

At an action 944, a 3D palm cue 1064 is displayed to a user of the wearable headset 1002 of user of system 1001. In one implementation 3D palm cue 1064 is semitransparent image of a palm that may be stylized or more realistic in presentation. The camera 1003 (or 3D sensor) is optionally positioned on the front side of the wearable headset 1002 thereby enabling the camera 1003 to capture images of the user's palm.

At an action 946, system 1001 attempts to detect palm in position indicated by the 3D palm cue for a specific period of time.

At an action 948, if the period of time has elapsed without detecting a palm, then at action 950, system 1001 returns authentication failed.

Otherwise, at action 952, the system proceeds to authenticate the user based upon the detected palm.

Now with reference to FIG. 11, the user has placed their palm 1006 so that palm 1006 is positioned over the 3D palm cue 1064 in the same planar direction. Noteworthy is that in the example implementation shown in FIG. 11, the 3D palm cue 1064 includes one or more finger guides 1005 to indicate to the user where to place the user's fingers. Now with reference to FIG. 11, the user has placed their palm 1006 in front of them guided by the palm cue 1064 such that one or more fingers 1007 of the user's palm 1006 are oriented along the finger guides 1005 in the palm cue 1064. Using the techniques described, a placement of the user's palm at a particular location can be used to define an active region or optimal placement or trigger the start of hand related tasks. These tasks include but are not limited to palm-based biometric authentication, confirmation, hand tracking, gesture control, etc.

Security Applications

Figure 12A:
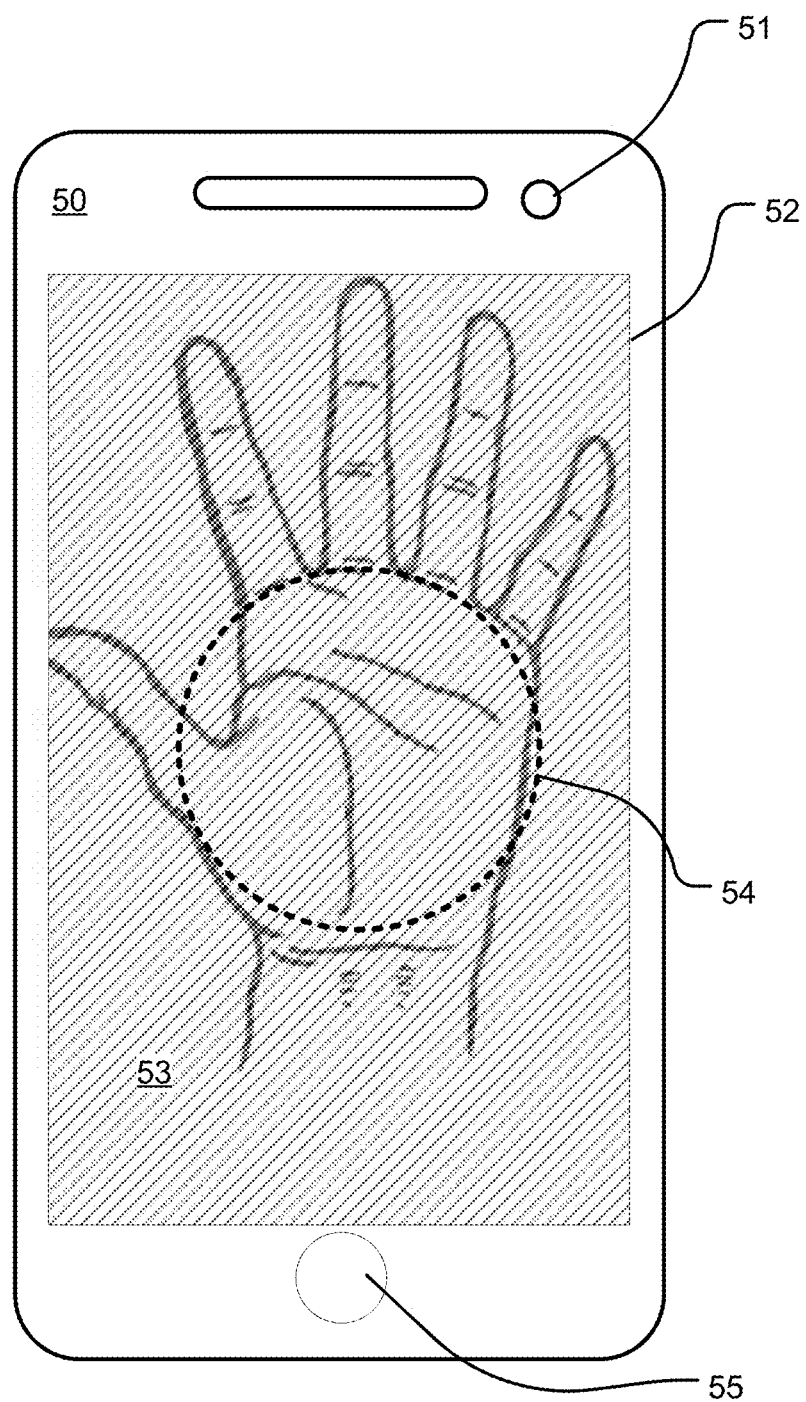
FIG. 12A illustrates an example mobile telephone in which one implementation can be embodied.

FIG. 12A illustrates an alternative configuration embodiment, in which a computing module as described above is disposed on a mobile telephone 50. In other examples, the computing device can be a laptop, desktop, smart TV, etc. The mobile telephone 50 includes a front facing (selfie) camera having a lens 51 and a display screen 52. In this example, a button 55 is on the face of the mobile phone 50. The field of view of the camera via lens 51 is a region above the display screen 52. A viewfinder image produced by the camera is displayed on the display screen 52 in this example. In some embodiments, the viewfinder image is limited to a region, such as the circular region 54 shown in the drawing. The mobile telephone 50 includes logic to execute a sequence of operations to perform a palm authentication process.

The display 62 is hatched to indicate the presence of an illumination pattern 53 on the display generated by an image frame produced by the computing device within a color range appropriate to the wavelength sensitivity of the camera and the type of detection (e.g., palm print, palm vein, multi-modal) that is being employed. The illumination pattern can be solid, or hatched or patterned allowing clear view of unmasked parts of the display. In the illustrated example, the illumination pattern is partially transparent, allowing view of the image captured by the camera simultaneously with an overlying illumination pattern. In other embodiments, the illumination pattern may include an opening (e.g. clear space) in region 54 for example configured to show a region of interest in the image, and allow a clearer view for the purposes of guiding a user to place their palm relative to region 54 enabling clear and improved capture of images of the palm by the camera facilitating better authentication results.

As a result use of the illumination pattern in a wavelength predominantly in an appropriately selected range (e.g., non-visible, near-visible, infra-red, combinations, and/or others), the display 62 is not as likely to attract attention of bystanders during the authentication process.

Furthermore, using an illumination source having an emission spectrum including wavelengths selected for appropriateness to the wavelength sensitivity of the camera and the type of detection (e.g., palm print, palm vein, multi-modal) that is being employed allows identifying a large number of features using intensity gradients in wavelengths in the selected range, suitable for use in the authentication process. Thus, illumination only in this range can be relied upon in embodiments of the present technology. Also, processing only of data indicating features within the wavelength range selected using images taken under illumination predominantly in the selected range can be relied upon in embodiments of the present technology. In some embodiments, the emission spectrum of the illumination source can be limited to wavelengths in the selected range.

Experimentation has been conducted to compare the feature density of palm images at different wavelengths. Below are the relative densities of corner features at different spectra.

The corner features were extracted with Matlab function "detectFASTFeatures" with the contrast threshold at 0.01. The data has been normalized to the high density features detectable under blue light at 460 nm.

| Color | Wavelength | Relative Feature Density |
| --- | --- | --- |
| Blue | 460 nm | 1.00 |
| Orange | 630 nm | 0.25 |
| Red | 700 nm | 0.19 |
| IR1 | 850 nm | 0.10 |
| IR2 | 940 nm | 0.04 |
| White | | 0.81 |

As can be seen, different ranges of wavelengths have different levels of effectiveness for the purposes of extracting skin surface features from an image of a palm. For example, examples include illumination sources effective for extracting skin surface features having wavelengths in the range of 485 to 350 nm. Shorter wavelengths may be damaging to the eyes and the skin.

Figure 12B:
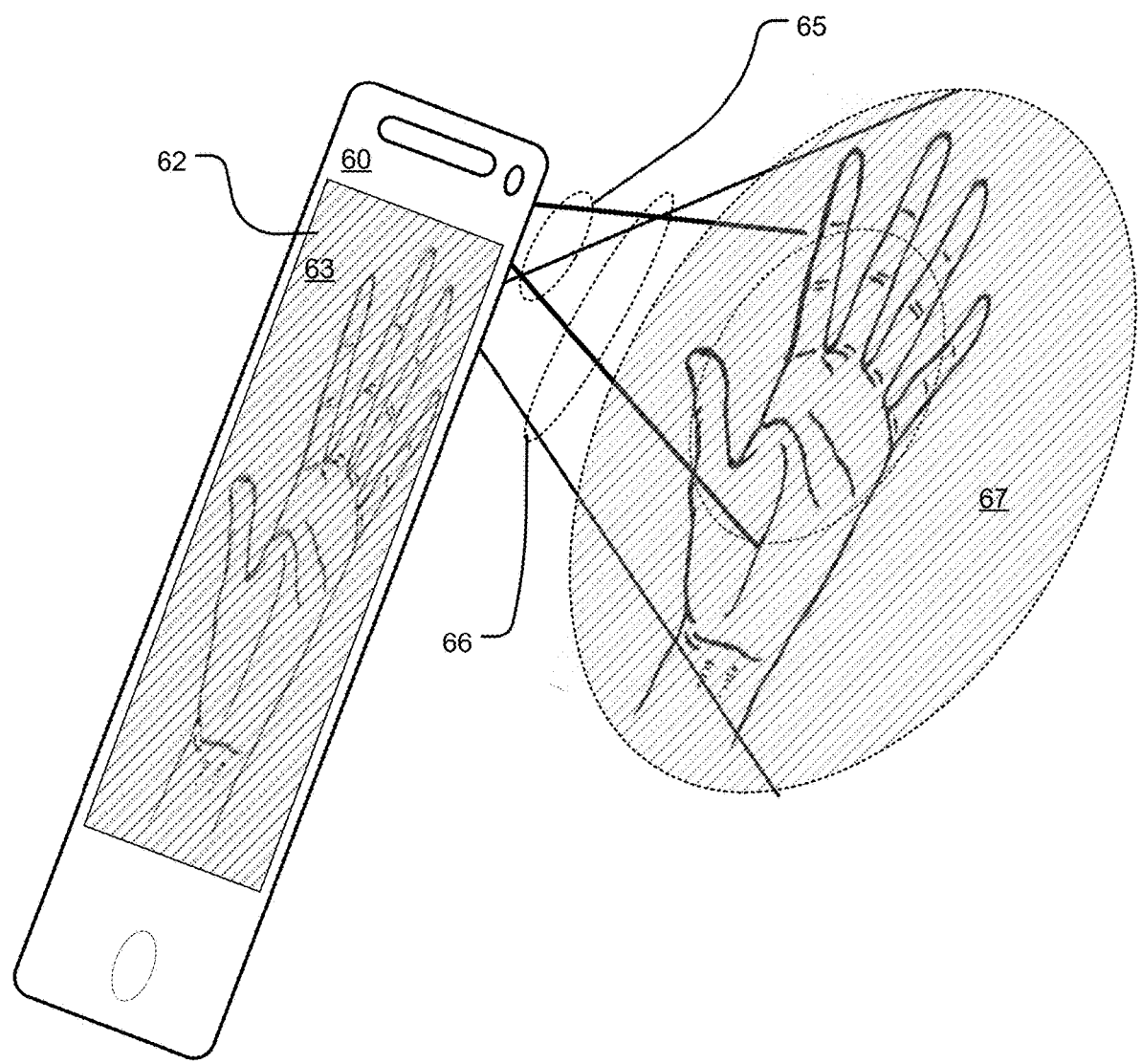
FIG. 12B illustrates an example mobile telephone in which an alternative implementation can be embodied.

FIG. 12B illustrates a computing device in an alternative configuration, which is in this example is mobile phone 60. In other examples, the computing device can be a laptop, desktop, smart TV, virtual or augmented reality (VR/AR) headsets, etc. The mobile phone includes a rear facing camera having a lens (not shown) with a field of view 65, and a display screen 62. The field of view 65 of the camera is a region below or behind the display screen 62. The mobile phone 60 includes an illumination source on the rear side with the lens of the camera configured to illuminate a field 66 below or behind the display screen 62. The illumination source can be an LED or other source according to embodiments described herein which has an emission spectrum predominantly in wavelengths in a range selected to be appropriate to the wavelength sensitivity of the camera and the type of detection (e.g., palm print, palm vein, multi-modal) that is being employed. The illumination source can be a narrow band source in the target wavelength range, or a broader band source with a filter limiting emission to the target range.

A viewfinder image 63 produced by the camera is displayed on the display screen 62 in this example. In some embodiments, the viewfinder image may be limited to a portion of the full display as discussed above. Because the illumination source has an emission spectrum having predominantly wavelengths within the selected range, the color of the display screen 62 is likewise dominated by that range of wavelengths. For this reason, the display screen is less likely to attract attention during an authentication process.

The mobile phone 60 is a computing device that includes logic to execute the sequence of operations to perform palm print authentication as discussed above. In this example, the sequence need not include displaying an illumination pattern on the display 62. In some embodiments, a dark or lowlight pattern may be overlaid on the display screen, so that the screen is less likely to attract attention in low light conditions.

In executing the sequence of operations, an image or set of images is captured from the field of view 65 in the illuminated field 67 of a palm in which the wavelength of the illumination source is the predominant light source.

Figure 12C:
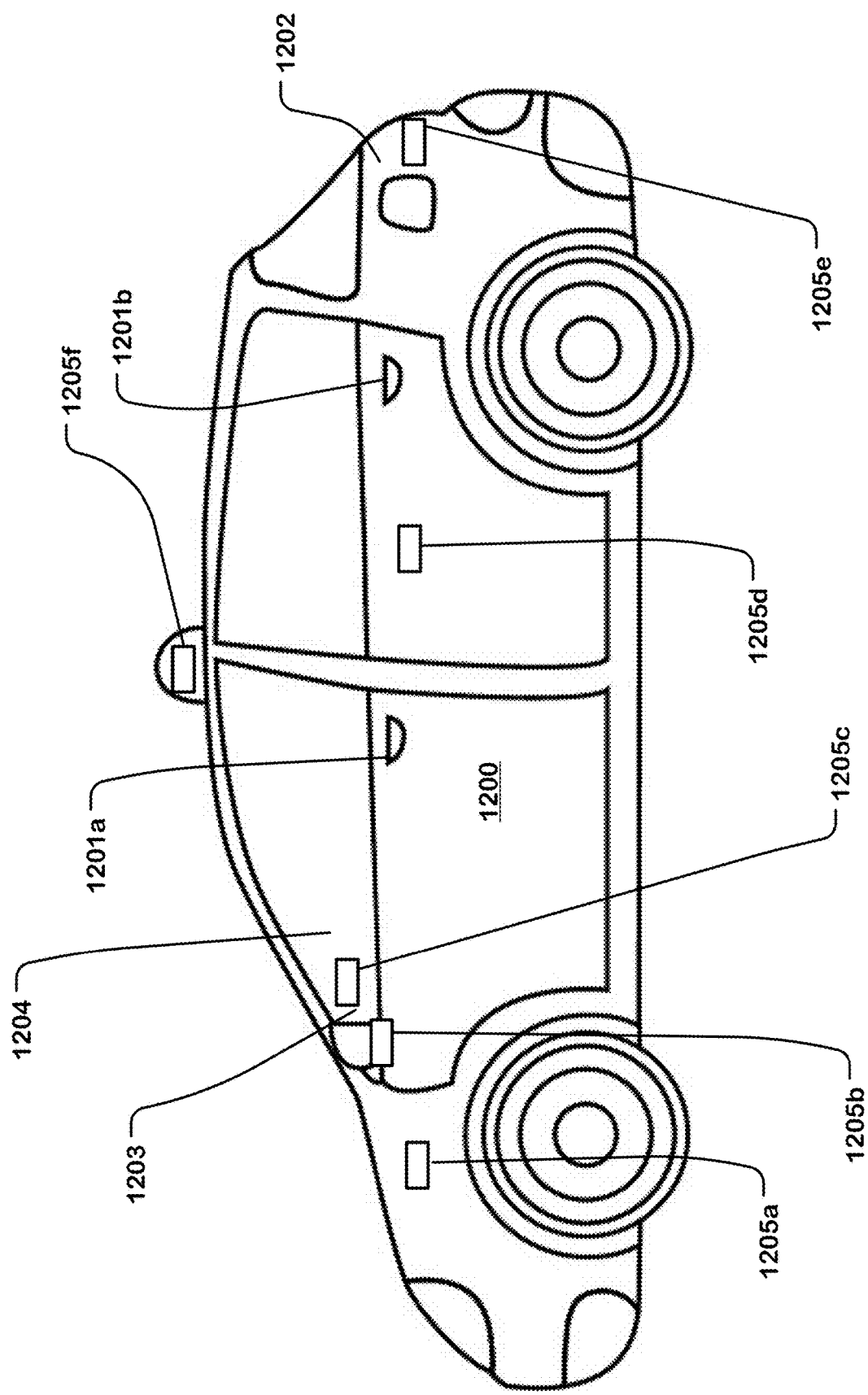
FIG. 12C illustrates an example automobile in which a variety of implementations can be embodied.

Computing platforms as described herein can also be deployed on automobiles or other machinery, and used for authentication of authorized users of the machinery to enable further functions. FIG. 12C schematically illustrates an automobile, with various configurations of computing devices configured for palm authentication as described herein. The automobile 1200 can have a number of cameras connected with computing devices that are disposed for examples in engine compartment 1205a, on the rearview mirror housing 1205b, inside the passenger compartment near the driver 1205c, on the side of the car 1205d, on the rear of the car 1205e or in a sensor compartment 1205f on the roof. The computing devices can be dedicated to individual cameras or be connected to multiple cameras. Subsystems that can be controlled by the computing devices can include subsystems to unlock or open the driver or passenger exterior doors (1201a, 1201b). Also, such subsystems can include a subsystem to unlock or open a trunk lid or rear hatch door 1202. Also, such subsystems can include a subsystem 1203 to start the engine or to enable starting of the engine. A subsystem 1204 can be deployed either inside or outside the car for personalization of things such as seat adjustment, climate control settings, entertainment system customizations, and communications links to account information in the cloud, or other functions.

Signals produced by the computing platform indicating successful matching can be used to enable operation of sub-systems of an automobile, including sub-systems to open a driver-side door or a passenger-side door, to open a trunk lid, to enable starting an engine, to cause machinery to implement personalization of seating position, to cause personalization of entertainment system settings, and to cause personalization of climate system settings.

The computing devices can be configured to utilize existing cameras on the car, especially in self-driving cars. Furthermore, the computing devices can include dedicated cameras. The cameras utilized by the computing devices during the authentication procedures can be placed inside the car for instance close to the control panel, or outside the car for instance in the side mirror, or on the front, back, side or top of the car.

Figure 13:
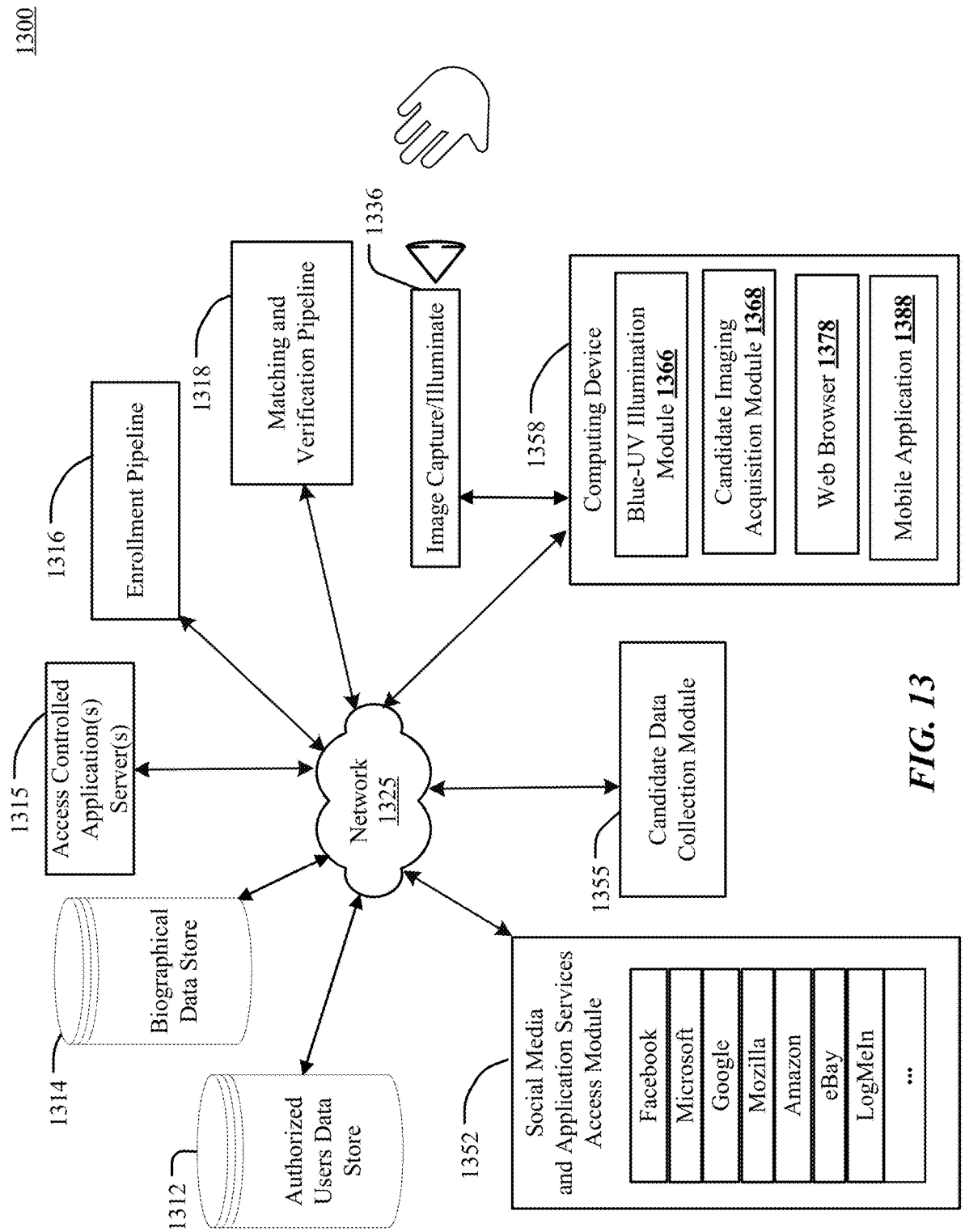
FIG. 13 illustrates an overview of an example network system in which enrollment and matching pipelines can be embodied.

FIG. 13 illustrates an overview of an example network system. FIG. 13 illustrates one implementation of a biometric network environment 1300 in which enrollment and matching pipelines can be embodied. FIG. 13 shows that environment 1300 can include authorized users data store 1312, a biographical data store 1314, an access controlled application(s) server(s) 1315, an enrollment pipeline software and/or server 1316, a matching pipeline software and/or server 1318, and a network 1325. Customization environment 1300 further includes a social media access module 1352, a candidate data collection module 1355, an image capture module 1336, and a computing device 1358. In other implementations, environment 1300 may not have the same elements as those listed above and/or may have other/different elements instead of, or in addition to, those listed above.

The authorized users data store 1312 can include candidate identification and biometric identifying information. In the authorized users data store 1312, biometric data for approved or authorized individuals can be identified as corresponding with the authorized users' biometric data provided by the matching and verification pipeline and/or server 1318. Biometric data in the authorized users data store 1312 can include different data types such as free-form text, structured text, and/or unstructured text.

Matching pipeline software and/or server 1318 can provide the biometric identification and verification functionality described herein, in a cloud computing environment, on-premises installation or hybrid thereof, which can be delivered in a subscription basis. In some implementations, matching pipeline software and/or server 1318 is on-demand software that is accessed by user sites via a thin client via a web browser or mobile application. In many implementations, the matching pipeline software and/or server 1318 supports customization, in which configuration options can be altered to fit a particular installation, to affect the look and feel and functionality of the software. For example, to support customers' common need to change an application's look and feel so that the application appears to have the customer's brand, the product can utilize a customer's logo and custom colors.

Some implementations include a biographical data store 1314 containing biographical and behavioral data for authorized users. Biographical information identifies the verification candidate and/or the candidate's company. Identifying information can include business segment and job role data, such as company name, operating division, location, job-title, normalized job responsibilities, past employment, education, and affiliations. Behavioral data can include authorized (and non-authorized attempts) to enter a premises being access-controlled by the environment 1300. Other behavioral factors such as browsing history or normalized data extracted from browsing history, and social media interactions such as recent business contacts, affiliations, mentions, subscriptions and other data that indicates or suggests to which organizations the candidate has access permissions can also be stored by biographical data store 1314.

Biographical data store 1314 includes different data types such as free-form text, structured text, and/or unstructured text. In some implementations, biographical data store 1314 can include URLs and web page content such as blog posts, as well as browsing history for videos, music and business contacts.

The access controlled application(s) server(s) 1315 can access the data of the biographical data store 1314 to match user biographic data to the candidates whose identities are verified. The access controlled application(s) server(s) 1315 can include rules or classifiers that map candidate attributes of identified candidates to applications, such as for example companies (or organizations) IT assets, that the candidate is permitted access based upon proper verification of the candidate's identity. The technology disclosed automatically authorizes a verified candidate for access to a variety of premises, systems or spaces based upon the biographical data in the biographical data store 1314. Trust-encouraging procedures and safeguards can be implemented to preserve the candidate's confidence that personal data is being used appropriately and for limited purposes, preferably with the candidate's knowledge and consent.

The access controlled application(s) server(s) 1315 can include templates for organizing information in the biographical data store 1314, as well as rules or classifiers for mapping a candidate's industry segment, job role and other attributes to selected subsets of available systems, premises or persons that the candidate is determined to have access to by the access controlled application(s) server(s) 1315. In some implementations, the biographical data store 1314 can include results obtained by running a machine learning training session using the data from the demonstration trials outcomes.

In one implementation, the candidate data collection module 1355 collects observed behavior of a particular candidate for addition to the biographical data store 1314. That is, the access controlled application(s) server(s) 1315 can adapt a candidate's permissions over time based upon collected behavioral information for the candidate. The access controlled application(s) server(s) 1315 can include rule or classifier based algorithms for mapping candidate email and browsing history and candidate social media interests to potential authorizations to people, premises and/or systems.

Social media access module 1352 may include, but is not limited to access to Facebook, Microsoft, Google, Mozilla, Amazon, eBbay, LogMeIn and so forth.

Candidate data collection module 1355 collects and manages data for the authorized users biographical data store 1314 including the interests of candidates who are subject to verification, i.e., authorized users data store 1312, typically by opting-in and giving their permission for the use of browsing information from commercial websites. This data may, for example, include a list of what products have been accessed via a candidate's browser. The candidate data collection module 1355 can monitor browser cookies, and super cookies that include X-UIDH headers. This data may additionally include topic interest information gleaned from a candidate's social media use. Other implementations could be on an opt-out basis. Sometimes, behavior watching has been implemented without notice or with notice that users are likely to miss, which is not the preferred approach.

In some implementations, the modules of environment 1300 can be of varying types, including workstations, servers, computing clusters, blade servers, server farms, or any other data processing systems or computing devices. Modules can be communicably coupled to the data store via a different network connection. For example, access controlled application(s) server(s) 1315 and enrollment pipeline software and/or server 1316 can be coupled via the network 1325 (e.g., the Internet) and candidate data collection module 1355 can be coupled to a direct network link. In some implementations, social media access module 1352 may be connected via a WiFi hotspot. In some implementations, an image capture/illuminate 1336 can be connected via the network 1325 to a computing device 1358. The image capture/illuminate 1336 can also be connected directly to computing device 1358 using Bluetooth or other popular communications medium.

In some implementations, network(s) 1325 can be any one or any combination of Local Area Network (LAN), Wide Area Network (WAN), WiFi, WiMAX, telephone network, wireless network, point-to-point network, star network, token ring network, hub network, peer-to-peer connections like Bluetooth, Near Field Communication (NFC), Z-Wave, ZigBee, or other appropriate configuration of data networks, including the Internet.

The computing device 1358 includes a web browser 1378 and/or a mobile application 1388, a blue/violet/UV illumination module 1366, and a candidate imaging acquisition module 1368 that provides prompts and interface to capture images of candidates to be verified. The candidate imaging acquisition module 1368 can work in conjunction with image capture/illuminate 1336 to acquire images for verification purposes. In some implementations, computing device 1358 can be a personal computer, laptop computer, tablet computer, smartphone, personal digital assistant (PDA), digital image capture devices, and the like.

In some implementations, data stores can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

Particular Implementations

In one implementation, an apparatus including palm authentication is described. The apparatus can be used to authenticate target individuals based upon capturing images of the palm of the target individual's hand (or other body part) substantially without contact with a surface (e.g., "touchlessly"). The technology may be embodied in wearable systems such as head mounted devices (HMD)s, goggles and the like, to provide access control of applications using the head mounted device. The apparatus can be used in stand-alone systems, or made available over local area network (LAN), wide area network (WAN), or inter-networks implementing cloud or other architectures in addition to special purpose devices (e.g., smartphone, tablets, pens, watches and the like). The apparatus includes a computing device including or in communication with a headset having a display screen and a camera. The computing device includes logic to execute a sequence of operations, the sequence of operations including presenting across the display screen, a viewfinder image. The viewfinder image includes at least a cue appearing to reside substantially in front of a user wearing the headset. The viewfinder image includes at least the cue to guide a user wearing the headset to place a palm in at least a position within a field of view of the camera. The sequence of operations also includes capturing a set of images, using the camera, of the palm. The set of images is processed to determine a set of identifying features of the palm. The set of identified features is compared with enrolled palm templates to identify the palm. Whether the palm identified belongs to a set of authorized credentials of persons authorized to access one or more applications using the headset is determined. The user wearing the headset is permitted access to at least one application whenever the user wearing the headset is a person that is authorized.

Some implementations also include in the sequence of operations, a cue that is a 3D virtual object displayed stereoscopically using a semi-transparent display against a real world background viewable to the user through the semi-transparent display.

Some implementations also include in the sequence of operations, displaying the cue to the user as having a tilted angle, the tilted angle reflecting an angle of tilt between a plane of vision of the user and an image plane of the camera.

Some implementations also include in the sequence of operations, determining a size for the cue appropriate to the user based upon a size of the user's palm, and displaying the cue to appear on the screen using the size determined.

Some implementations also include in the sequence of operations, displaying the viewfinder image, and wherein the viewfinder image includes displaying the cue superimposed upon a live image stream captured by the camera.

Some implementations also include in the sequence of operations, displaying a viewfinder image and wherein the viewfinder image includes displaying the cue superimposed upon a live image stream captured by the camera displayed stereoscopically using a semi-transparent display, and a mask to block a real world background from being viewable to the user through the semi-transparent display.

Some implementations also include the camera is installed on a side of the headset, and in the sequence of operations, shifting by a computed offset the image, and displaying the image shifted; making the palm appear to the user wearing the headset to be placed in front of the user wearing the headset and coincident with a point of view of the user wearing the headset without the offset of the camera forming the viewfinder image.

Some implementations also include in the sequence of operations determining a size for the cue appropriate to the user based upon a size of the user's palm, and displaying the cue to appear to the user of the size determined.

Some implementations also include in the sequence of operations displaying across a display screen an image resembling a hand with fingers generally outstretched to reveal an open space in which to align an image captured of a palm.

Some implementations also include in the sequence of operations displaying a display screen an image of roughly a circle or roughly an ellipse and with an open space in which to align an image captured of a palm.

Some implementations also include in the sequence of operations, upon identification of the palm, generating a signal to enable a further process.

Some implementations also include in the sequence of operations, upon identification of the palm, generating a signal to enable operations of a virtual reality or augmented reality headset.

In one implementation, a method of matching a palm digital representation to a palm template is described. The method can be used to authenticate target individuals based upon capturing images of the palm of the target individual's hand or other body part substantially without contact with a surface (e.g., "touchlessly"). The technology may be embodied in wearable systems such as head mounted devices (HMD)s, goggles and the like, stand-alone systems, or made available over local area network (LAN), wide area network (WAN), or internetworks implementing cloud or other architectures in addition to special purpose devices (e.g., smartphone, tablets, pens, watches and the like). The method includes performing a coarse alignment of a palm digital representation with a palm template by translation, rotation and scaling to approximate a normalized template perimeter. Feature matching in a raster domain of a first set of at least 10 non-overlapping palm features between the digital representation and the template, can be conducted. Feature matching can include framing a location of the second feature within a predetermined distance of the selected location and at the multiple locations, selecting a best match and representing the best match with a match score and a direction and distance between the selected location of the first feature and the best match location of the second feature. The method can further include performing a fine alignment between the digital representation and template. The method further includes determining parameters for further translation, rotation and scaling of the digital representation to produce a fine-aligned digital representation. Using the distribution and distance for a plurality of the second set of features to score aggregate similarity between the fine-aligned digital representation and the template; and reporting the aggregate similarity score for further processing are also part of the method.

Some implementations also include selecting non-overlapping palm features from detected edges.

Some implementations also include selecting non-overlapping palm features from detected contours.

Some implementations also include generating a template of a palm by capturing a plurality of images of at least one palm; creating a composite based on the captured images; and storing the composite as a palm digital representation of the palm.

Some implementations also include presenting a viewfinder image across a display screen or screens of a wearable headset. The viewfinder image can include a stream of images from a camera and a cue appearing to reside substantially in front of a user wearing the headset. The viewfinder image and the cue guide a user wearing the headset to align a palm at a position within a field of view of the camera.

In some implementations whether the palm identified belongs to a set of authorized credentials of persons authorized to access one or more applications using the headset is determined. Some implementations will permit access to at least one application whenever the user wearing the headset is a person that is determined to be authorized.

In some implementations, the cue can be stereoscopic.

In some implementations, the cue can be an image resembling a hand with fingers generally outstretched to reveal an open space in which to align an image captured of a palm.

In some implementations, the cue can be an image of roughly a circle or roughly an ellipse and with an open space in which to align an image captured of a palm.

In some implementations, upon identification of the palm, a signal is generated to enable a further process.

In some implementations, upon identification of the palm, a signal is generated to enable operations of a virtual reality or augmented reality headset.

In some implementations, upon identification of the palm, a signal is generated to enable operations of a sub-system of an automobile.

In some implementations, upon identification of the palm, a signal is generated to enable operations of surgical or medical equipment.

Some implementations also include capturing a plurality of images of at least one palm by controllably energizing one or more illumination sources according to an energy profile to advantageously illuminate the palm; thereby providing increased contrast between features of the palm prints and/or palm veins to be identified and surrounding artifacts in the captured images over contrast obtained capturing images under uncontrolled lighting.

In some implementations, the one or more illumination sources are controllably energized according to a ramp profile.

In some implementations, the one or more illumination sources are controllably energized to a transition time of more than 300 ms.

In some implementations, the one or more illumination sources are controllably energized to provide illumination wavelength below 460 nm.

In some implementations, the one or more illumination sources are controllably energized to provide illumination wavelength above 320 nm.

In some implementations, the one or more illumination sources are controllably energized to provide illumination wavelength in a 380-400 nm range.

In some implementations, the one or more illumination sources are controllably energized to provide illumination wavelength above 800 nm.

In some implementations, the one or more illumination sources are controllably energized to provide illumination wavelength in a 850-940 nm range.

Other implementations may include a computer implemented system to perform any of the methods described above, the system including a processor, memory coupled to the processor, and computer instructions loaded into the memory. Yet another implementation may include a tangible computer readable storage medium impressed with computer program instructions; the instructions, when executed on a processor, cause a computer to implement any of the methods described above.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. An apparatus including palm authentication, comprising:
a computing device including or in communication with a headset having a display screen and a camera, the computing device operable to execute at least one application implementing on the display screen a virtual reality or augmented reality environment;
the computing device including logic to execute a sequence of operations, the sequence of operations including:
presenting across the display screen, a viewfinder image including at least a cue comprising a 3D virtual object displayed stereoscopically and appearing to reside substantially in front of a user wearing the headset; wherein the viewfinder image includes at least the cue to guide a user wearing the headset to place a palm of the user in a position aligned with the 3D virtual object within a field of view of the camera;
capturing a set of images, using the camera, of the palm at the position aligned with the 3D virtual object;
processing the set of images to determine a set of identifying features of the palm;
comparing the set of identified features with enrolled palm prints to identify the palm;
authenticating the user by determining whether the palm identified belongs to a set of authorized credentials of persons authorized to access one or more applications using the headset; and
permitting access to the at least one application whenever the user wearing the headset is a person that is authorized.

2. The apparatus of claim 1, wherein the sequence of operations includes denying access to at least one application whenever the user wearing the headset is a person that is not authorized.

3. The apparatus of claim 1, wherein said presenting includes displaying the cue to the user as having a tilted angle, the tilted angle reflecting an angle of tilt between a plane of vision of the user and an image plane of the camera.

4. The apparatus of claim 1, wherein said presenting a viewfinder image includes determining a size for the cue appropriate to the user based upon a size of the user's palm, and displaying the cue to appear on the screen using the size determined.

5. The apparatus of claim 1, wherein presenting the cue includes displaying across a display screen an image resembling a hand with fingers generally outstretched to reveal an open space in which to align an image captured of a palm.

6. The apparatus of claim 1, wherein presenting the cue includes displaying on a display screen an image of roughly a circle or roughly an ellipse and with an open space in which to align an image captured of a palm.

7. The apparatus of claim 1, wherein the sequence of operations includes, upon identification of the palm, generating a signal to enable a further process.

8. The apparatus of claim 1, wherein the sequence of operations includes, upon identification of the palm, generating a signal to enable operations of a virtual reality or augmented reality headset.

9. The apparatus of claim 1, in which the step of comparing the set of identified features with enrolled palm prints to identify the palm comprises: identifying the palm based on biometric data consisting of the set of identified features.

10. An apparatus comprising:
a computing device including or in communication with a headset having a display screen and a camera, the computing device operable to execute at least one application implementing on the display screen a virtual reality or augmented reality environment;
the computing device including logic to execute a sequence of operations, the sequence of operations including:
presenting across the display screen, a viewfinder image including at least a cue comprising a 3D virtual object displayed stereoscopically and appearing to reside substantially in front of a user wearing the headset; wherein the viewfinder image includes at least the cue to guide a user wearing the headset to place a palm of the user in a position aligned with the 3D virtual object within a field of view of the camera;
capturing a set of images, using the camera, of the palm at the position aligned with the 3D virtual object;
processing the set of images to determine a set of identifying features of the palm;
comparing the set of identifying features with enrolled palm prints to identify the palm;
authenticating the user by determining whether the palm identified is associated with a person authorized to access one or more applications using the headset; and
permitting access to at least one of said applications;
wherein the sequence of operations includes displaying the viewfinder image, and wherein the viewfinder image includes: displaying the cue superimposed upon a live image stream captured by the camera, and displaying a mask to block a portion of a real world background peripheral to the cue from being viewable to the user through the display.

11. The apparatus of claim 10, wherein the mask is displayed with high intensity.

12. The apparatus of claim 10, wherein the cue comprises an opening in the mask.

13. An apparatus comprising:
a computing device including or in communication with a headset having a display screen and a camera, the computing device operable to execute at least one application implementing on the display screen a virtual reality or augmented reality environment;
the computing device including logic to execute a sequence of operations, the sequence of operations including:
presenting across the display screen, a viewfinder image including at least a cue comprising a 3D virtual object and appearing to reside substantially in front of a user wearing the headset; wherein the viewfinder image includes at least the cue to guide a user wearing the headset to place a palm of the user in a position aligned with the 3D virtual object within a field of view of the camera;
capturing a set of images, using the camera, of the palm at the position aligned with the 3D virtual object;
processing the set of images to determine a set of identifying features of the palm;
comparing the set of identifying features with enrolled palm prints to identify the palm;
authenticating the user by determining whether the palm identified is associated with a person authorized to access one or more applications using the headset; and
permitting access to at least one of said applications;
wherein the sequence of operations includes displaying the viewfinder image, and wherein the viewfinder image includes displaying the cue superimposed upon a live image stream captured by the camera;

wherein the camera is installed on a side of the headset, and said presenting a viewfinder image includes shifting by a computed offset images captured by the camera, and displaying the images captured by the camera shifted; thereby making the palm appear to the user wearing the headset to be placed in front of the user wearing the headset and coincident with a point of view of the user wearing the headset without the offset of the camera forming the viewfinder image.

14. A method for palm authentication, comprising:

presenting across a display screen of a headset, a viewfinder image implementing a virtual reality or augmented reality environment and including at least a cue appearing to reside substantially in front of a user wearing the headset; wherein the cue is a 3D virtual object displayed stereoscopically; and wherein the viewfinder image including at least the cue guides a user wearing the headset to place a palm of the user in a position aligned with the 3D virtual object within a field of view of a camera coupled to the headset;

capturing a set of images, using the camera, of the palm at the position aligned with the 3D virtual object;

processing the set of images to determine a set of identifying features of the palm;

comparing the set of identified features with enrolled palm prints to identify the palm;

authenticating the user by determining whether the palm identified belongs to a set of authorized credentials of persons authorized to access one or more applications using the headset; and permitting access to at least one application whenever the user wearing the headset is a person that is authorized.

15. The method of claim 14, including denying access to at least one application whenever the user wearing the headset is a person that is not authorized.

16. The method of claim 14, wherein the cue is displayed to the user as having a tilted angle, the tilted angle reflecting an angle of tilt between a plane of vision of the user and an image plane of the camera.

17. The method of claim 14, further comprising determining a size for the cue appropriate to the user based upon a size of the user's palm, and displaying the cue to appear on the screen using the size determined.

18. The method of claim 14, wherein said presenting a viewfinder image includes displaying the viewfinder image, and wherein the viewfinder image includes displaying the cue superimposed upon a live image stream captured by the camera.

19. The method of claim 14, wherein presenting a viewfinder image includes displaying across a display screen a 3D virtual object resembling a hand with fingers generally outstretched to reveal an open space in which to align an image captured of a palm.

20. The method of claim 14, wherein presenting a viewfinder image includes displaying across a display screen an image of roughly a circle or roughly an ellipse and with an open space in which to align an image captured of a palm.

21. The method of claim 14, upon identification of the palm, generating a signal to enable a further process.

22. The method of claim 14, upon identification of the palm, generating a signal to enable operations of a virtual reality or augmented reality headset.

23. A method for palm authentication, comprising:

presenting across a display screen of a headset, a viewfinder image implementing a virtual reality or augmented reality environment and including at least a cue comprising a 3D virtual object and appearing to reside substantially in front of a user wearing a headset;

wherein the viewfinder image includes at least the cue guiding a user wearing the headset to place a palm of the user in a position aligned with the 3D virtual object within a field of view of a camera coupled to the headset;

capturing a set of images, using the camera, of the palm at the position aligned with the 3D virtual object;

processing the set of images to determine a set of identifying features of the palm;

comparing the set of identified features with enrolled palm prints to identify the palm;

authenticating the user by determining whether the palm identified belongs to a set of authorized credentials of persons authorized to access one or more applications using the headset; and permitting access to at least one application whenever the user wearing the headset is a person that is authorized;

wherein the viewfinder image includes displaying (a) the cue superimposed upon a live image stream captured by the camera displayed stereoscopically, and (b) a mask to block a portion of a real-world background peripheral to the cue from being viewable to the user through the display.

24. The apparatus of claim 23, wherein the mask is displayed with high intensity.

25. The apparatus of claim 23, wherein the cue comprises an opening in the mask.

26. A method for palm authentication, comprising:

presenting across a display screen of a headset, a viewfinder image implementing a virtual reality or augmented reality environment and including at least a cue comprising a 3D virtual object and appearing to reside substantially in front of a user wearing the headset and superimposed upon a live image stream captured by a camera coupled to the headset; wherein the viewfinder image includes at least the cue guiding a user wearing the headset to place a palm of the user in a position aligned with the 3D virtual object within a field of view of the camera;

capturing a set of images, using the camera, of the palm at the position aligned with the 3D virtual object;

processing the set of images to determine a set of identifying features of the palm;

comparing the set of identified features with enrolled palm prints to identify the palm;

authenticating the user by determining whether the palm identified belongs to a set of authorized credentials of persons authorized to access one or more applications using the headset; and permitting access to at least one application whenever the user wearing the headset is a person that is authorized;

wherein the camera is installed on a side of the headset, and said presenting a viewfinder image comprises shifting by a computed offset the live image stream and displaying the live image stream shifted; thereby making the palm appear to the user wearing the headset to be placed in front of the user wearing the headset and coincident with a point of view of the user wearing the headset without the offset of the camera forming the viewfinder image.

27. A non-transitory computer readable storage medium impressed with computer program instructions to match a palm print digital representation to a palm print template, which instructions, when executed on a processor, implement a method comprising:
- presenting across a display screen of a headset, a viewfinder image implementing a virtual reality or augmented reality environment and including at least a cue appearing to reside substantially in front of a user wearing the headset; wherein the cue is a 3D virtual object displayed stereoscopically; and wherein the viewfinder image including at least the cue guides a user wearing the headset to align a palm of the user mat a position aligned with the 3D virtual object within a field of view of a camera coupled with the headset;
- capturing a set of images, using the camera, of the palm at the position aligned with the 3D virtual object;
- processing the set of images to determine a set of identifying features of the palm;
- comparing the set of identified features with enrolled palm prints to identify the palm;
- authenticating the user by determining whether the palm identified belongs to a set of authorized credentials of persons authorized to access one or more applications using the headset; and
- permitting access to at least one application whenever the user wearing the headset is a person that is authorized.

* * * * *